US007381010B2

(12) United States Patent
Alexander et al.

(10) Patent No.: US 7,381,010 B2
(45) Date of Patent: Jun. 3, 2008

(54) SYSTEM AND METHOD FOR REMOVAL OF BURIED OBJECTS

(75) Inventors: Robert G. Alexander, Richland, WA (US); Dennis Crass, Kennewick, WA (US); William Grams, Kennewick, WA (US); Steven J. Phillips, Sunnyside, WA (US); Mark Riess, Kennewick, WA (US)

(73) Assignee: Worth Wind, Inc. (Assignee of the interest of Grams, Crass, and Riess), Richland, WA (US)

( * ) Notice: Subject to any disclaimer, the term of this patent is extended or adjusted under 35 U.S.C. 154(b) by 0 days.

(21) Appl. No.: 11/512,745

(22) Filed: Aug. 29, 2006

(65) Prior Publication Data

US 2008/0101874 A1 May 1, 2008

Related U.S. Application Data

(60) Provisional application No. 60/712,755, filed on Aug. 29, 2005.

(51) Int. Cl.
*A01D 31/00* (2006.01)

(52) U.S. Cl. ...................... 405/233; 405/249; 405/303; 405/232; 171/1; 171/50; 171/62; 171/144

(58) Field of Classification Search ................ 405/232, 405/233, 237–240, 243, 249, 303; 171/1, 171/11, 50, 62, 144
See application file for complete search history.

(56) References Cited

U.S. PATENT DOCUMENTS

| | | | | |
|---|---|---|---|---|
| 2,488,074 A | * | 11/1949 | Thornley | 405/249 |
| 4,371,046 A | | 2/1983 | Read | 175/57 |
| 4,410,802 A | | 10/1983 | Szulinski | 250/515.1 |
| 4,452,321 A | | 6/1984 | Eriksson | 175/46 |
| 4,472,085 A | * | 9/1984 | Mohler | 405/255 |
| 4,909,323 A | | 3/1990 | Hastings | 166/242 |
| 5,029,653 A | | 7/1991 | Jurgens et al. | 175/58 |
| 5,230,390 A | | 7/1993 | Zastresek et al. | 175/232 |
| 5,435,387 A | | 7/1995 | Roberts | 166/242 |
| 5,445,229 A | | 8/1995 | Delima | 175/20 |

(Continued)

OTHER PUBLICATIONS

Article entitled "Demonstration of Over-Coring and Retrieval Technology For Vertical Pipe Units" from the 10th International Conference on Environmental Remediation and Radioactive Waste Management Sep. 4-8, 2005, Scottish Exhibition & Conference Centre, Glasgow, Scotland.

(Continued)

*Primary Examiner*—Frederick L Lagman
(74) *Attorney, Agent, or Firm*—Pedersen & Co., PLLC; Ken J. Pedersen; Barbara S. Pedersen

(57) ABSTRACT

The present invention is a system and method for removal of buried objects. According to one embodiment of the invention, a crane with a vibrator casing driver is used to lift and suspend a large diameter steel casing over the buried object. Then the casing is driven into the ground by the vibratory driver until the casing surrounds the buried object. Then the open bottom of the casing is sealed shut by injecting grout into the ground within the casing near its bottom. When the seal has cured and hardened, the top of the casing is lifted to retrieve the casing, with the buried object inside, from the ground.

26 Claims, 27 Drawing Sheets

U.S. PATENT DOCUMENTS

| | | | | |
|---|---|---|---|---|
| 5,541,968 | A * | 7/1996 | Brassel | 588/252 |
| 5,601,152 | A | 2/1997 | Harrison | 175/246 |
| 5,879,110 | A | 3/1999 | Carter, Jr. | 405/267 |
| 5,905,184 | A | 5/1999 | Carter, Jr. | 588/260 |
| 5,980,446 | A | 11/1999 | Loomis et al. | 588/250 |
| 6,135,204 | A | 10/2000 | McCabe et al. | 166/250.17 |
| 6,371,205 | B1 | 4/2002 | Langan et al. | 166/285 |
| 6,425,449 | B1 | 7/2002 | Marshall | 175/236 |
| 6,681,873 | B2 | 1/2004 | Griffin, Jr. | 175/58 |
| 6,860,936 | B2 | 3/2005 | Carter, Jr. | 106/718 |
| 6,910,829 | B2 | 6/2005 | Nickelson et al. | 405/129.2 |
| 2002/0022757 | A1 | 2/2002 | Kostelnik et al. | 588/17 |
| 2006/0052653 | A1 | 3/2006 | Chowdhury et al. | 588/312 |

OTHER PUBLICATIONS

Article entitled “Putting Down The Hammer” from the Tri-City Herald, dated Aug. 17, 2005.

* cited by examiner

SYSTEM AND METHOD FOR REMOVAL OF BURIED OBJECTS

This application claims priority from prior, now abandoned U.S. Provisional Patent Application No. 60/712,755, filed Aug. 29, 2005, the disclosure of which is incorporated herein by reference.

Activities related to this application were conducted under US Department of Energy (DOE) Contract No. DE-AC-09-03NT42006. The U.S. Government may have rights to practice this invention.

BACKGROUND OF THE INVENTION

1. Field of the Invention

This invention relates generally to removal of buried objects from the ground. More specifically, this invention relates to surrounding buried waste of a given diameter with a larger diameter casing, sealing the bottom of the casing with grout, and pulling the sealed casing out of the ground with the grout plug intact to retrieve the buried waste.

2. Related Art

U.S. Pat. No. 5,980,446 (Loomis et al.) discloses a method for injecting grout underground to form solid columns. A series of the columns may be overlapped to surround and isolate, for example, a buried waste pit.

Prior to enactment of current environmental regulations, waste was buried that must now be retrieved and then sent to an appropriate treatment, storage, or disposal facility (TSD). Some of these wastes, because of high worker safety risks or significant potential for contamination spread, will be difficult to retrieve using normal excavation techniques. For instance, from 1954 to 1967, Hanford 300 Area transuranic and other wastes were disposed of in the 618-10 and 618-11 Burial Grounds. Much of these wastes were disposed of in what was referred to as a vertical pipe unit (VPU). VPUs were constructed by welding 5 open-ended 55-gal drums end to end. Constructed VPUs were positioned in trenches to form vertical shafts, and wastes were deposited in the shafts. When full, VPUs were backfilled, capped with concrete, and buried under four to six feet of clean soil. The waste in these VPUs is potentially highly radioactive and in a form such that traditional excavation using a loader or backhoe may cause undue risk to workers or the environment.

SUMMARY OF THE INVENTION

The present invention is a system and method for removal of buried objects. According to one embodiment of the invention, a crane with a vibratory casing driver is used to lift and suspend a large diameter steel casing over the buried object. Then the casing is driven into the ground by the vibratory driver until the casing surrounds the buried object. Then the open bottom of the casing is sealed shut by injecting grout into the ground within the casing near its bottom. When the seal has cured and hardened, the casing is lifted to retrieve the casing, with the buried object inside, from the ground.

This invention provides a means for retrieval of waste which encapsulates the waste intact thus minimizing potential radiological or chemical exposures to workers or the public. Furthermore, this invention relies upon commercially available and mature equipment, technologies, and work practices that do not include technically difficult or complicated processes or procedures. This invention also relies on relatively few items of support equipment and the complete retrieval process can be completed in a very short amount of time compared to conventional excavation.

DETAILED DESCRIPTION OF THE INVENTION

Referring to the figures, there are depicted some, but not all, embodiments of the present invention.

Figure 1:
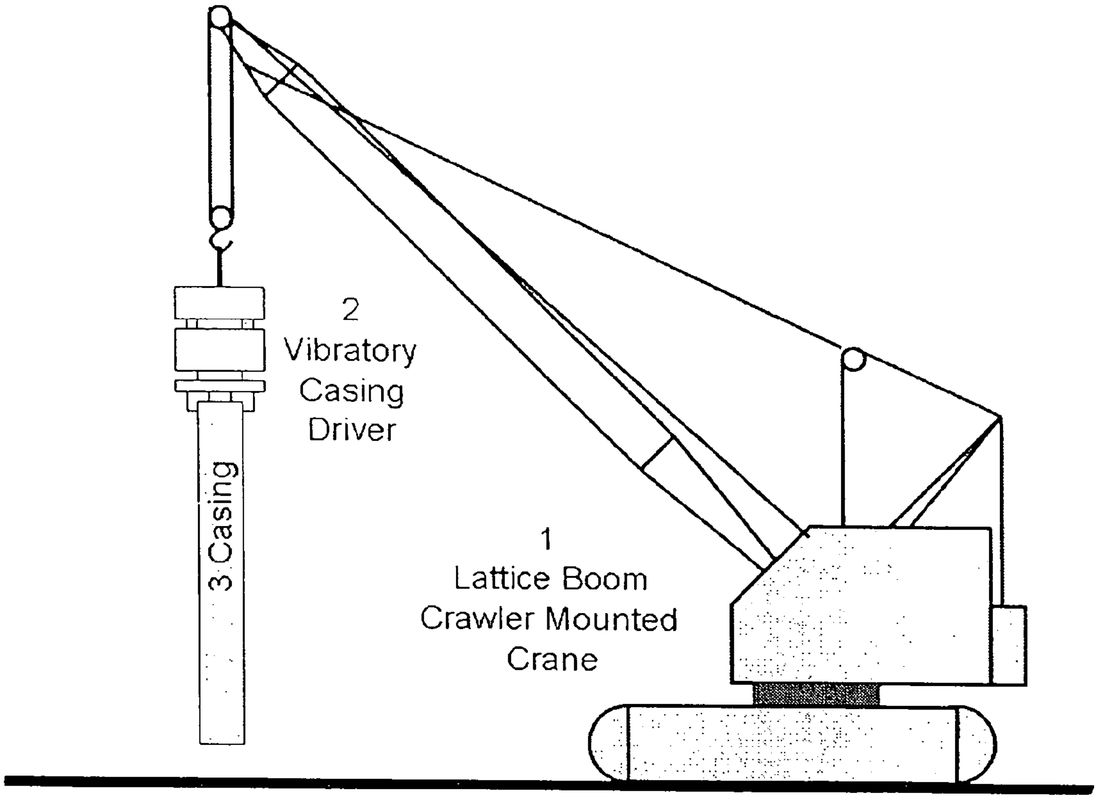
FIG. 1 is a side, schematic view of one embodiment of the invention wherein a crane with a vibratory casing driver has lifted and suspended a large diameter steel casing over the ground.

In FIG. 1, there is depicted crane 1 carrying vibratory casing driver 2, which driver 2 is connected to casing 3 so that casing 3 is suspended over the ground.

Figure 2:
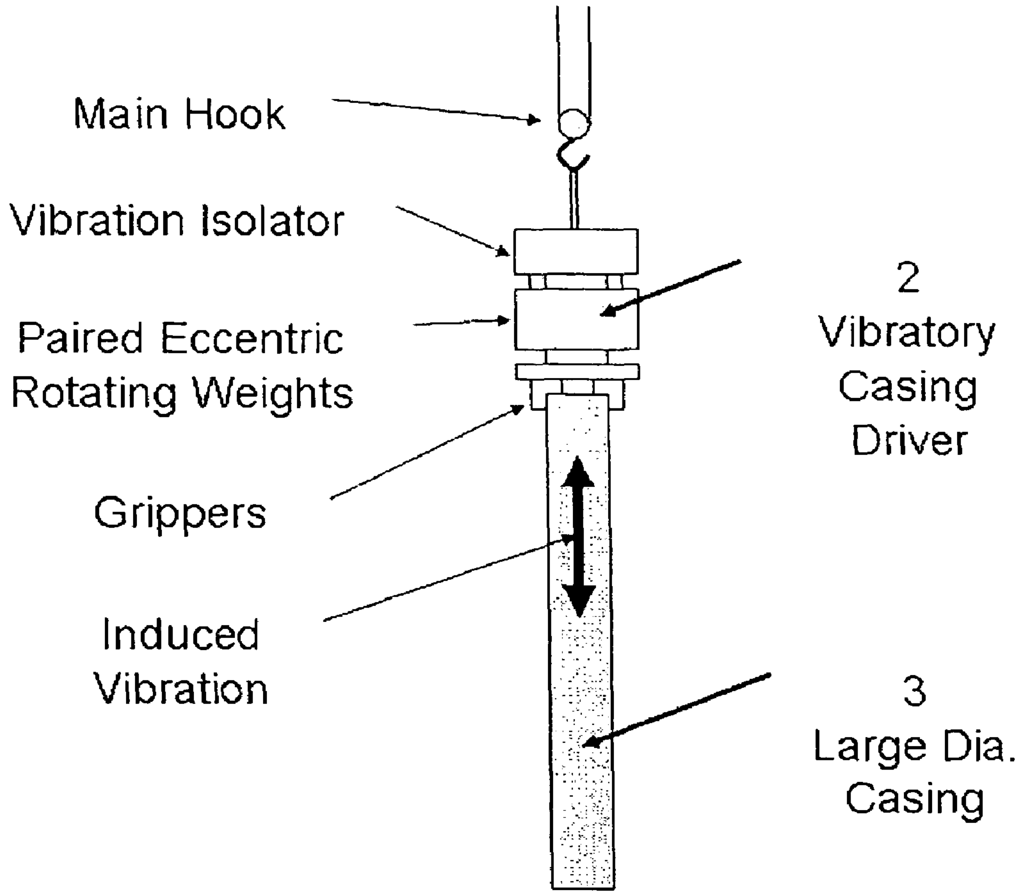
FIG. 2 is a side, schematic, detail view of the vibratory driver and casing depicted in FIG. 1.

FIG. 2 is a more detailed view of the vibratory casing driver (2) and casing (3) showing the three main elements of the casing driver (grippers, paired rotating eccentric weights, and vibration isolator). It further shows the up-down direction of induced vibration of the casing. In operation, the casing is attached to the vibratory casing driver with the hydraulic grippers or clamps. As a safety precaution, the casing is also attached loosely to the main hook with one or more slings and shackles (not shown).

Figure 3:
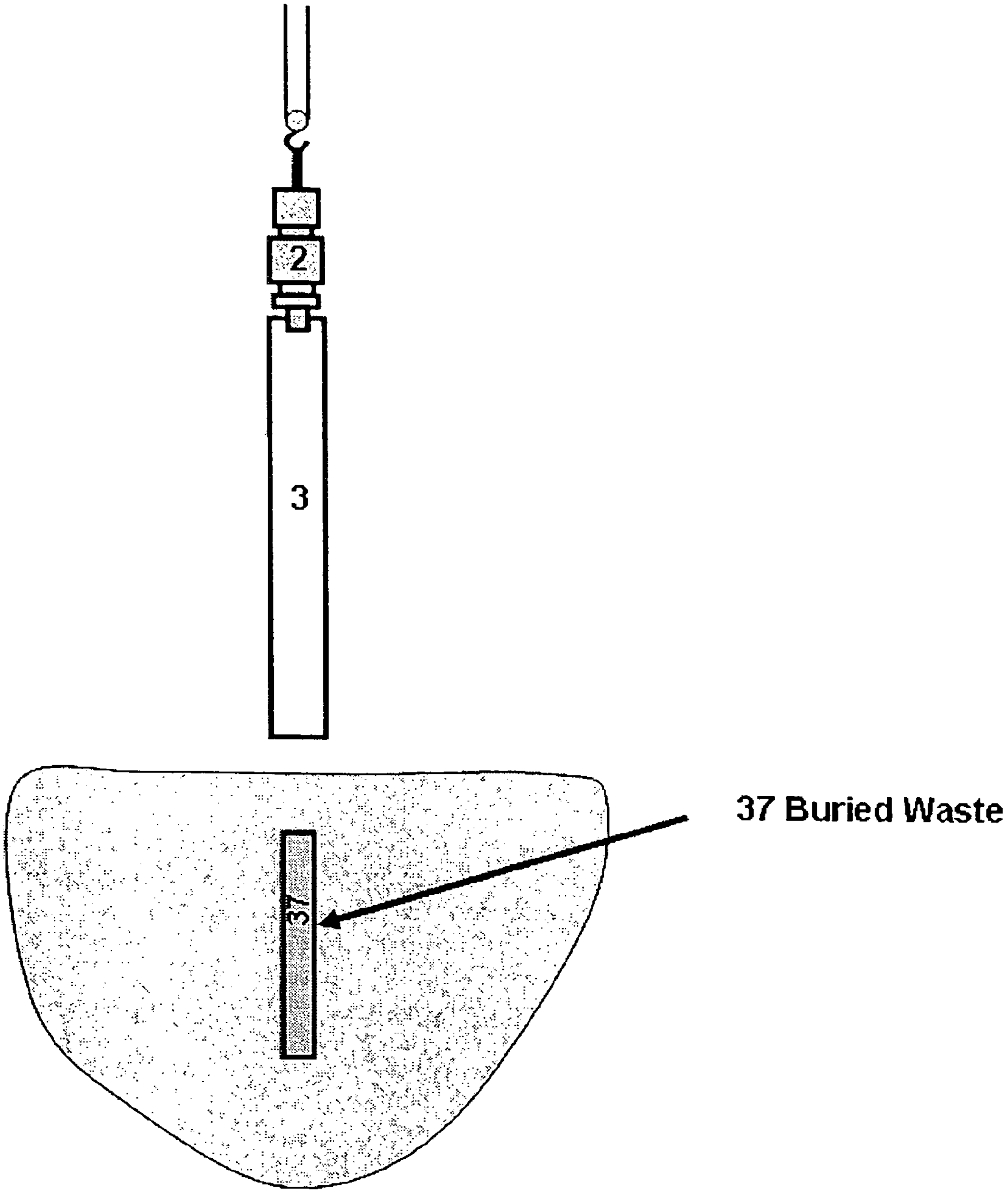
FIG. 3 is a side, schematic, partial view of one embodiment of the invention wherein a vibratory casing driver and a casing are suspended above buried waste in the ground.
Figure 11:
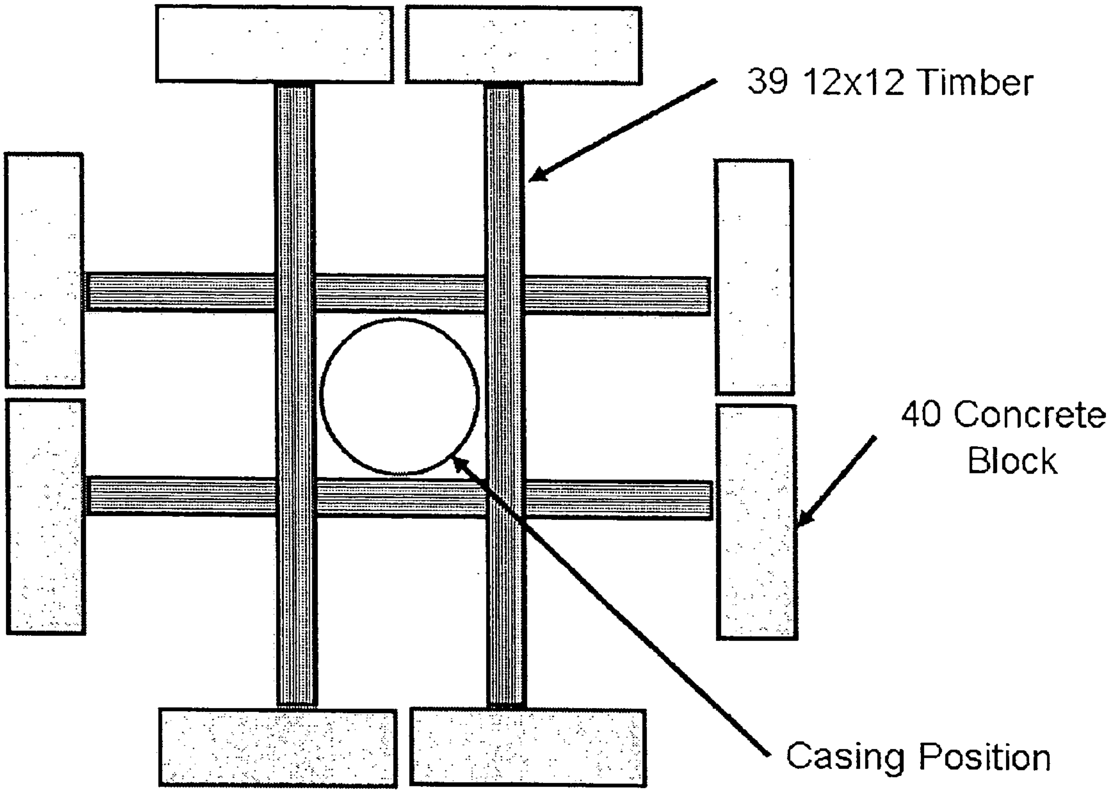
FIG. 11 is a top, schematic view of a casing positioning system according to one embodiment of the invention.
Figure 12:
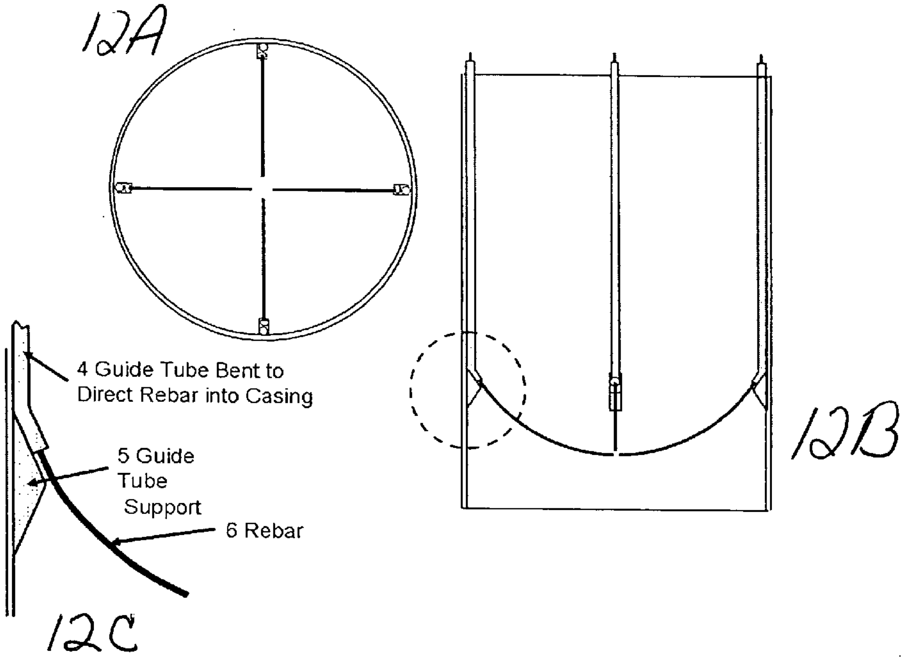
FIG. 12 is a schematic, detail collection of views of one embodiment of the optional reinforcement bar system of the invention near the bottom inside of the casing in its deployed position, including a top view (FIG. 12A), side view (FIG. 12B), and magnified detail view (FIG. 12C) from the dashed circle in FIG. 12B.

In operation the process begins with establishing the target or location for overcoring (surrounding) the buried waste. At this point a centralizer casing positioning system (see FIG. 11) is preferably positioned over the target as illustrated. Following this, the vibratory casing driver (2) is rigged to the lattice boom crane (1) using standard industry practices for hoisting and rigging. Then the casing is attached to the vibratory casing driver (2) by first activating the clamps and then attaching the safety slings from the casing (2) to the main hook of the crane. The casing is then hoisted to the vertical position, positioned over the centralizer, and oriented (either vertically or at a specific angle and azimuth) for overcoring the buried waste (37) as illustrated in FIG. 3.

Figure 4:
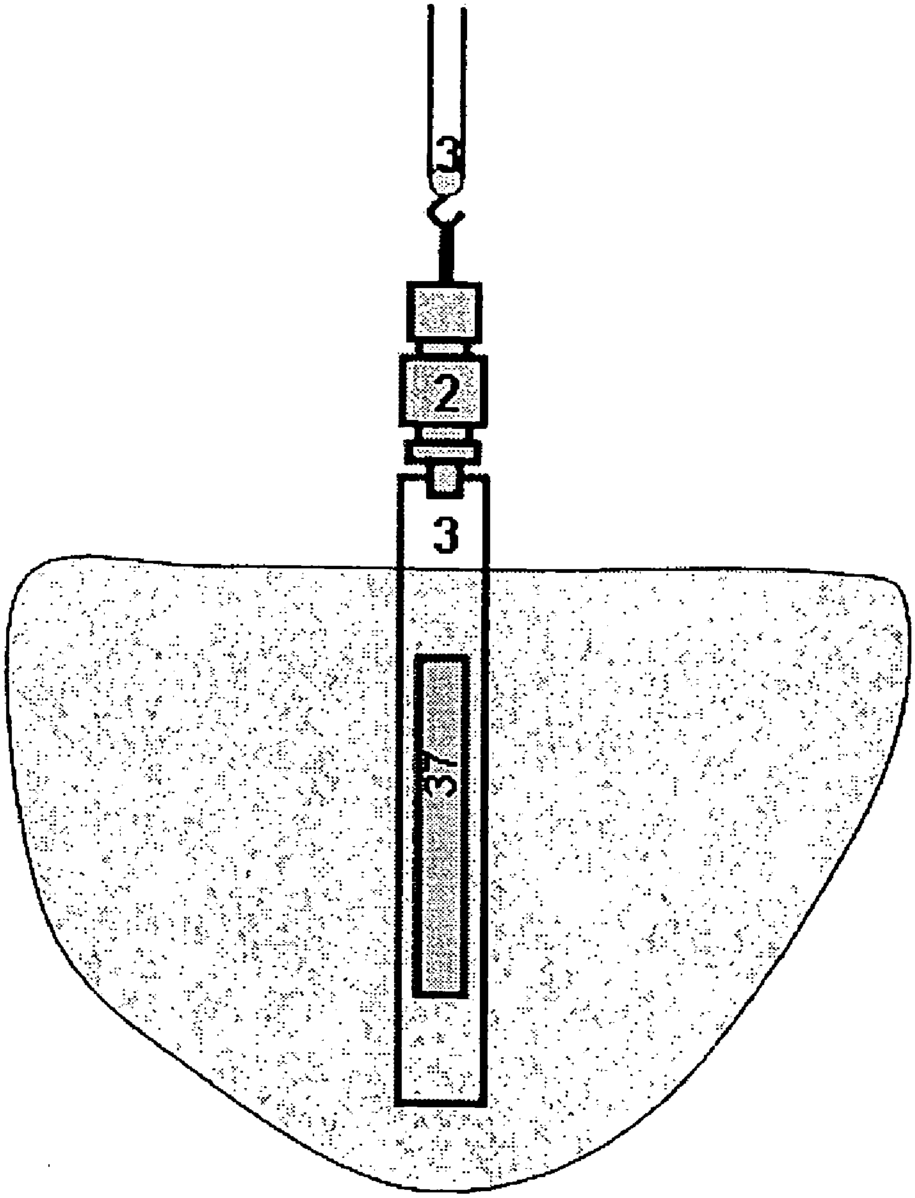
FIG. 4 depicts the equipment of FIG. 3 after the casing has been driven into the ground to surround the buried waste.
Figure 5:
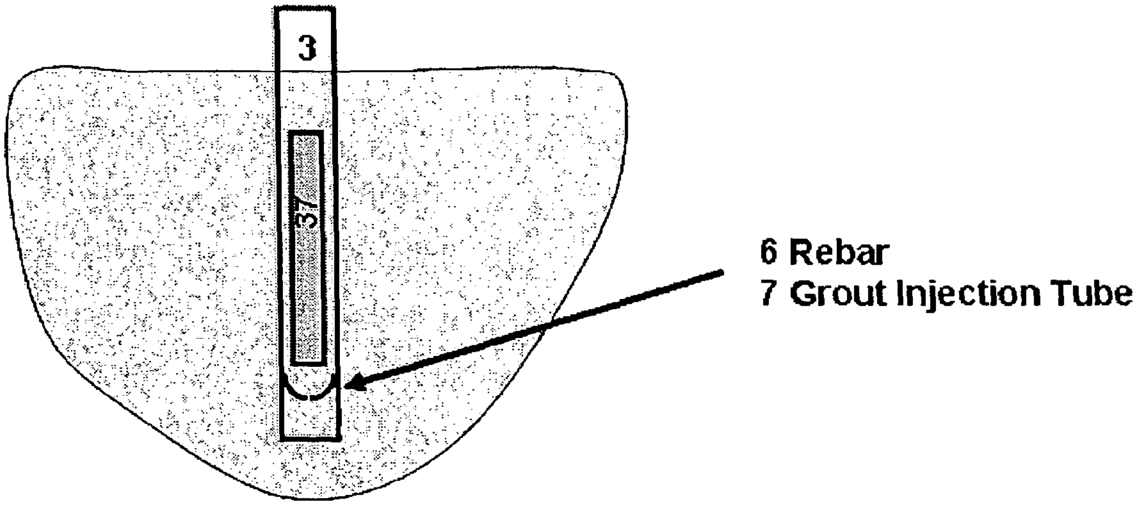
FIG. 5 depicts the inserted casing with the optional rebar and/or grout tubes deployed.
Figure 9:
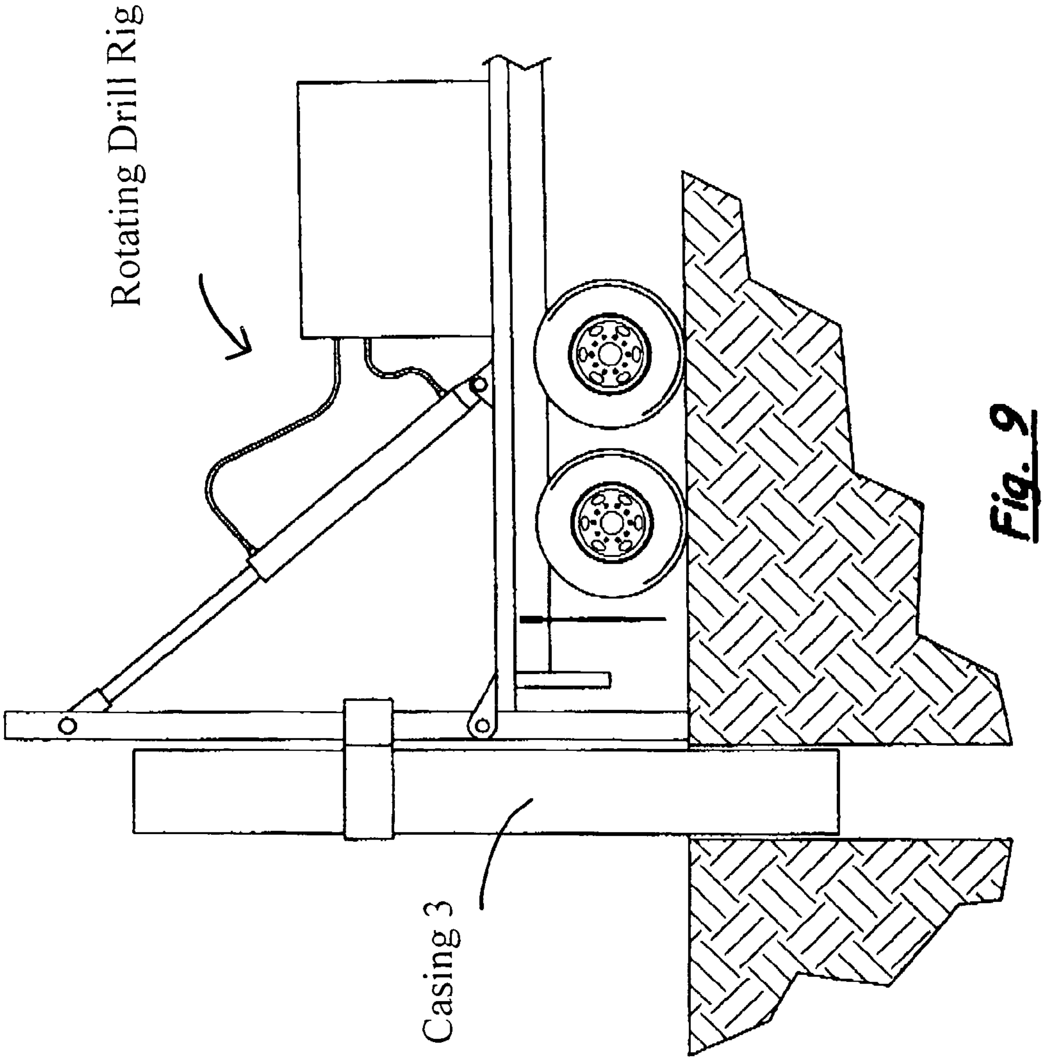
FIG. 9 is a side, schematic view of an alternative embodiment of the invention wherein the casing is lowered into, and raised from, the ground with a rotating drill rig.
Figure 10:
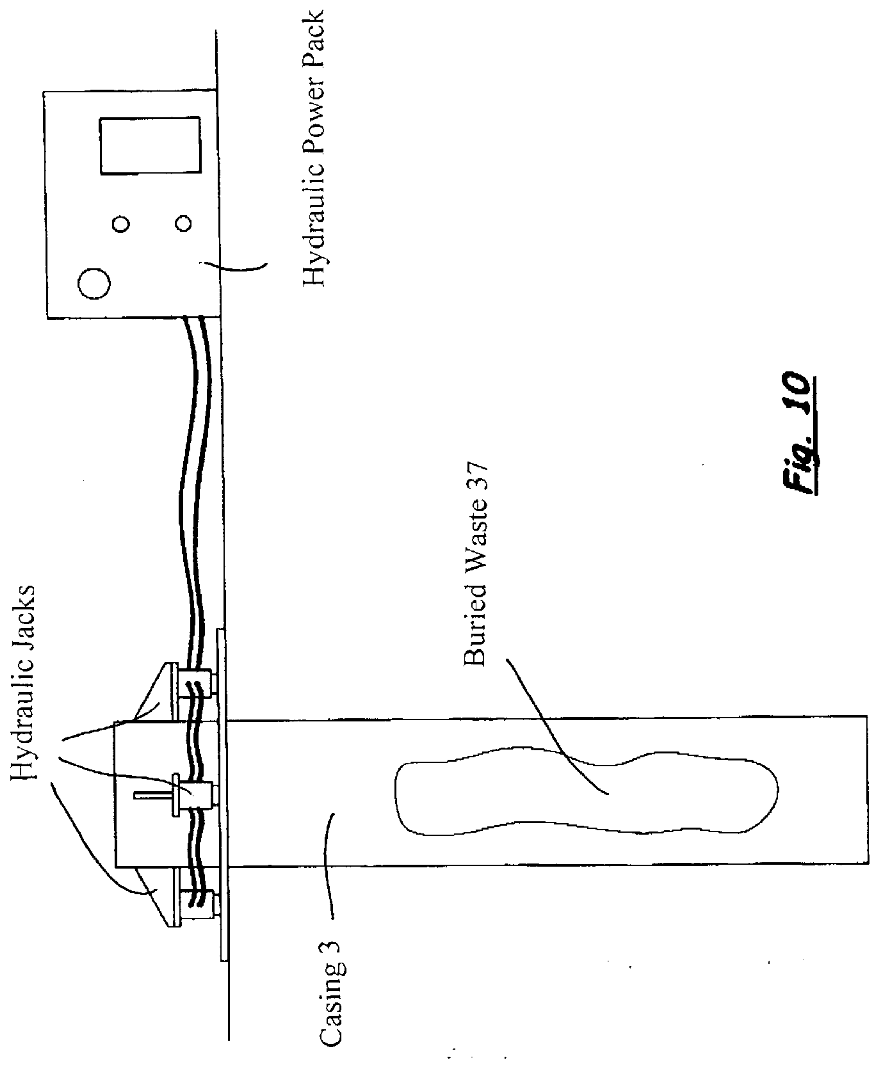
FIG. 10 is a side, schematic view of another alternative embodiment of the invention wherein the casing is lowered into, and raised from, the ground with a set of hydraulic jacks.

Overcoring requires coordination between the crane and vibratory casing driver operators. The vibratory casing driver is activated causing the casing to oscillate in an up-down motion (see FIG. 2) and the crane operator slowly lowers the main hook as the casing (2) is vibrated into the soil, encapsulating the buried waste (37) as illustrated in FIG. 4. Overcoring using a crane and vibratory casing driver is not the sole mechanism that may be used to surround the buried waste. Alternate methods may include use of diesel, pneumatic, or hydraulic pile drivers and a crane. Another alternate method may be to use a large rotary drill rig or a platform mounted race borer used in the mining and hydroelectric power industries for drilling large diameter openings (see FIG. 9), for example. Another alternate method may be to use a set of hydraulic jacks to lower and raise the casing (see FIG. 10).

Figure 6:
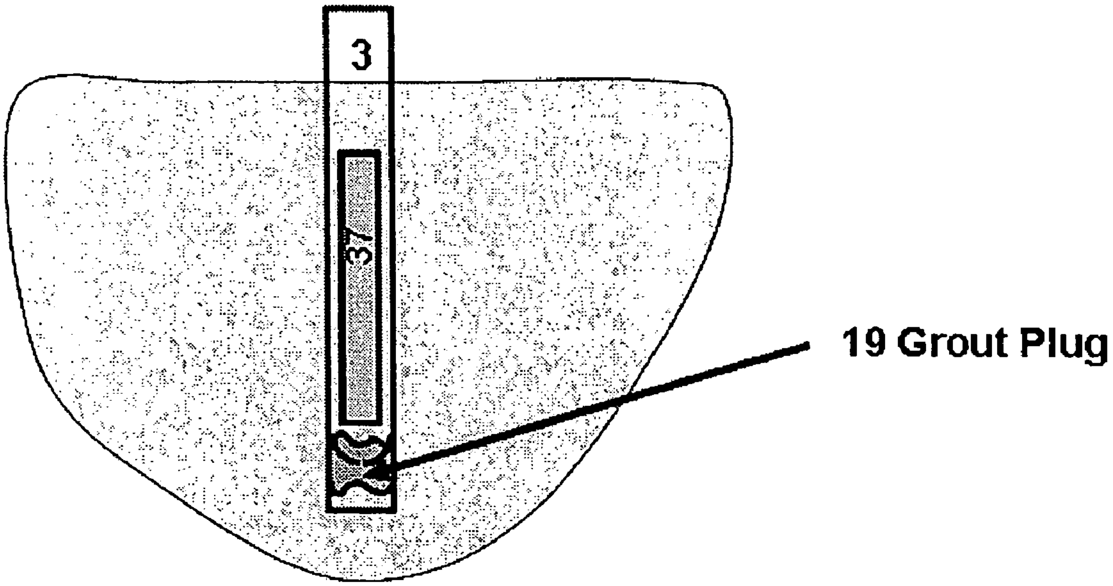
FIG. 6 depicts the inserted casing with the grout plug formed.
Figure 21:
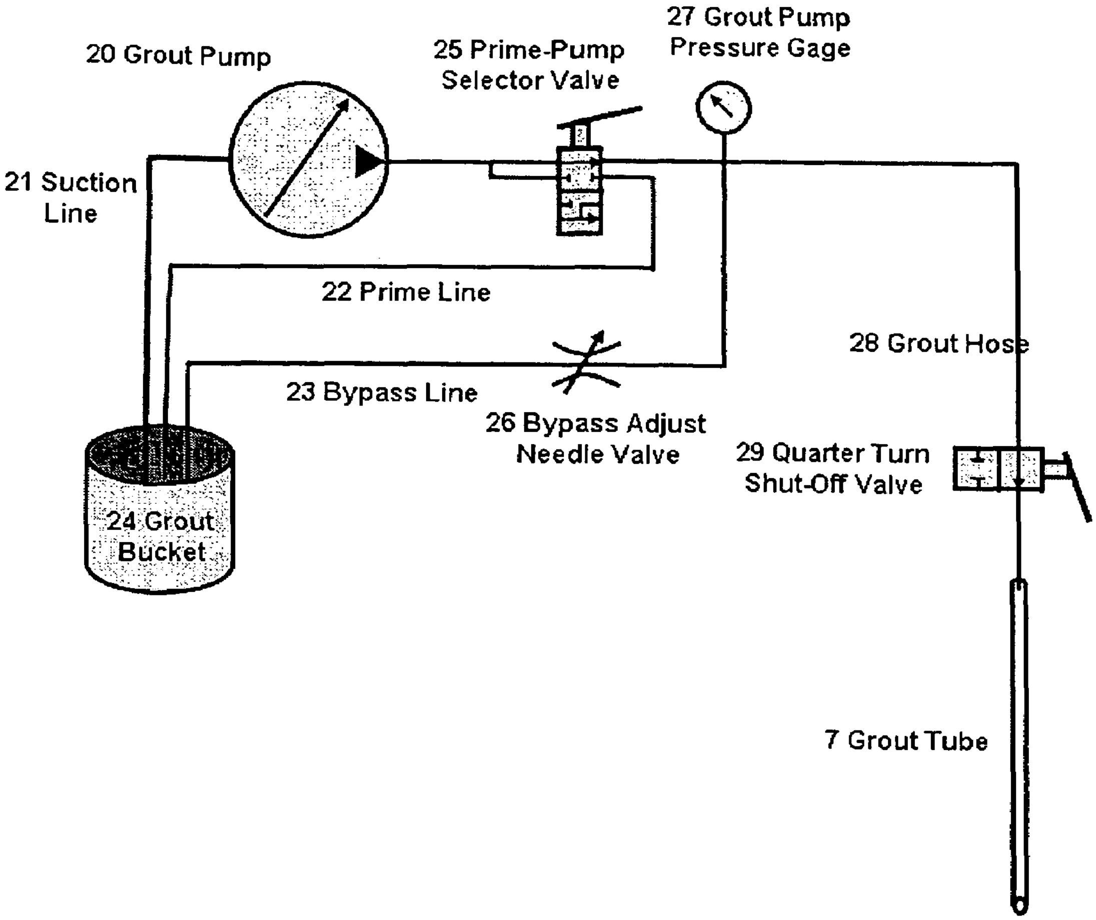
FIG. 21 is a schematic flow diagram of an embodiment of the invention with the grout pumping system for creating the plug.

The next step in the process is capturing the core by installation of the grout plug (19) and, optionally, the concrete cap (38). The first step in this process starts with disconnecting the vibratory casing driver (2) from the casing (3) and removing the centralizer (if used). Then the optional rebar (6) and grout injection tubes (7) are driven into position as shown in FIGS. 5, 12, 13, 15, 16, 18 and 19. Following this the grout plug (19) is installed preferably by first pumping a measured amount of water into each grout injection tube. This is preferred to ensure sufficient water to react with the preferred polyurethane permeation grout used to form the grout plug (19). Then a measured amount of grout is pumped either sequentially or simultaneously into each grout tube (7) forming the grout plug (19) upon setting of the grout as shown in FIG. 6. Typically, the grout will tend to set up within about 12 or more hours. Preferably, the grout plug is given at least about 24 or more hours to firmly set up. However, these setting times may change with different grout compositions and different setting conditions. The grout injection pumping hydraulic schematic is shown in FIG. 21, and will be discussed in more detail later.

Figure 7:
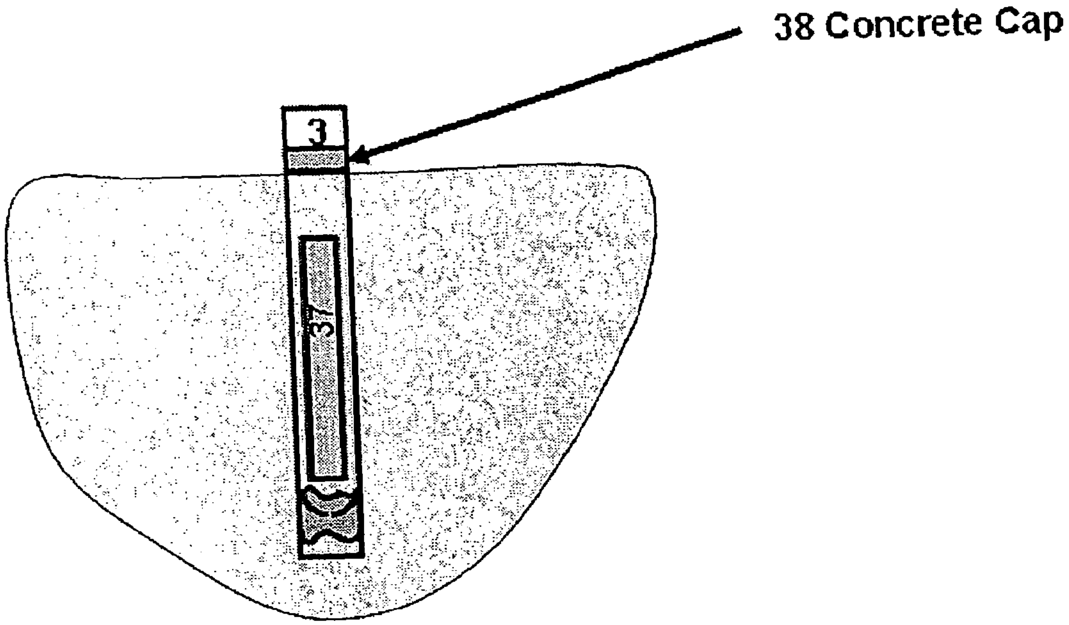
FIG. 7 depicts the inserted casing with an optional concrete cap formed.

Upon completion of grout pumping, the quarter turn shut-off valve (29) is moved to the closed position and the grout hose (28) disconnected. For toxic or dangerous buried waste, another step in the process is to place a concrete cap (38) on the top of the soil core as shown in FIG. 7. For less dangerous wastes, the concrete cap (38) may not be required. This completes the core capture process. Polyurethane permeation grout is preferred, however it is not the only grout material that may be used to form a grout plug. Cementitious grouts (e.g., neat portland cement paste), epoxies, silicates, or microfine cement permeation grouts may also be used.

Figure 8:
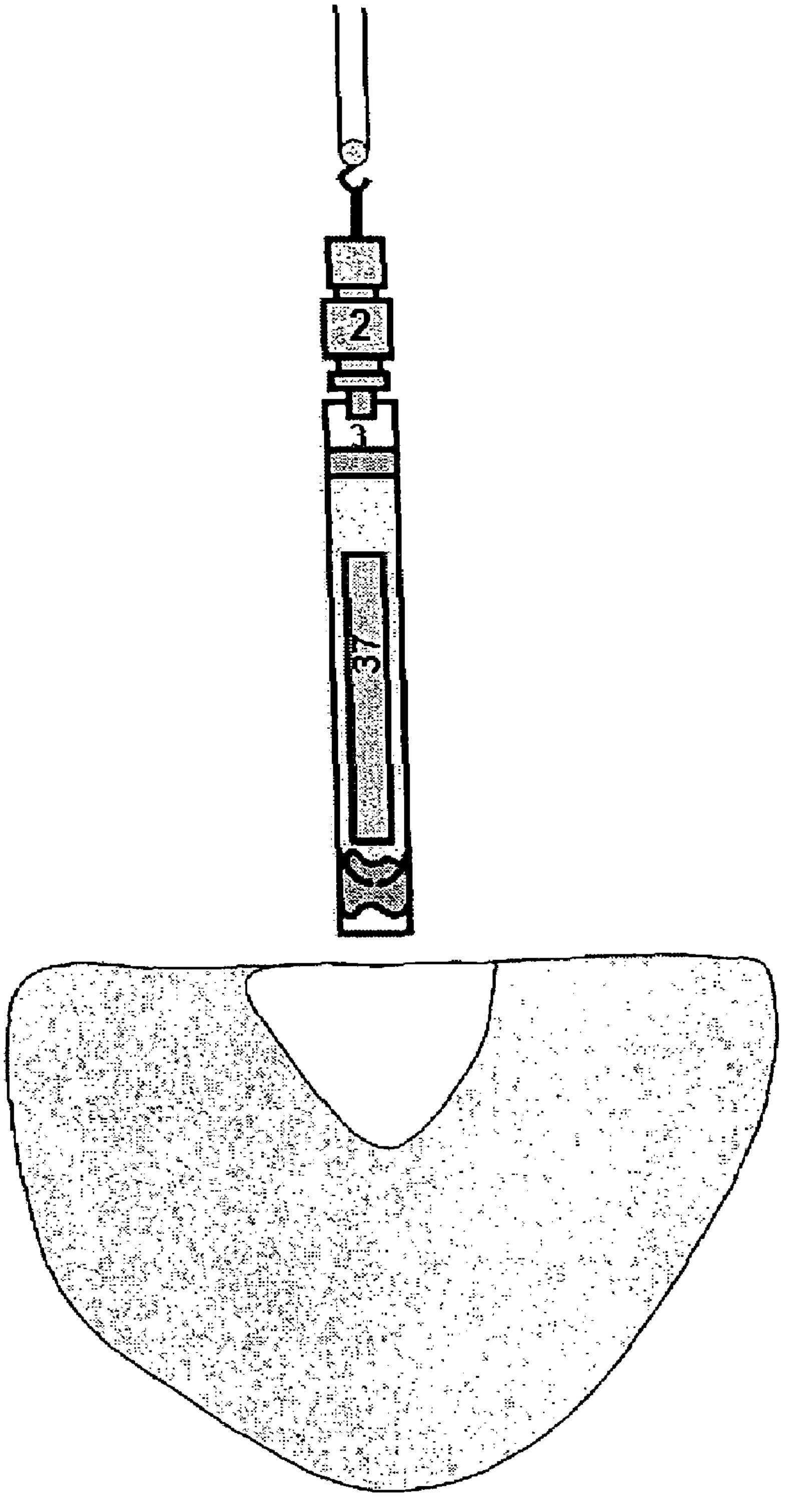
FIG. 8 depicts the extracted casing with optional cap, buried waste and grout plug intact.
Figure 24:
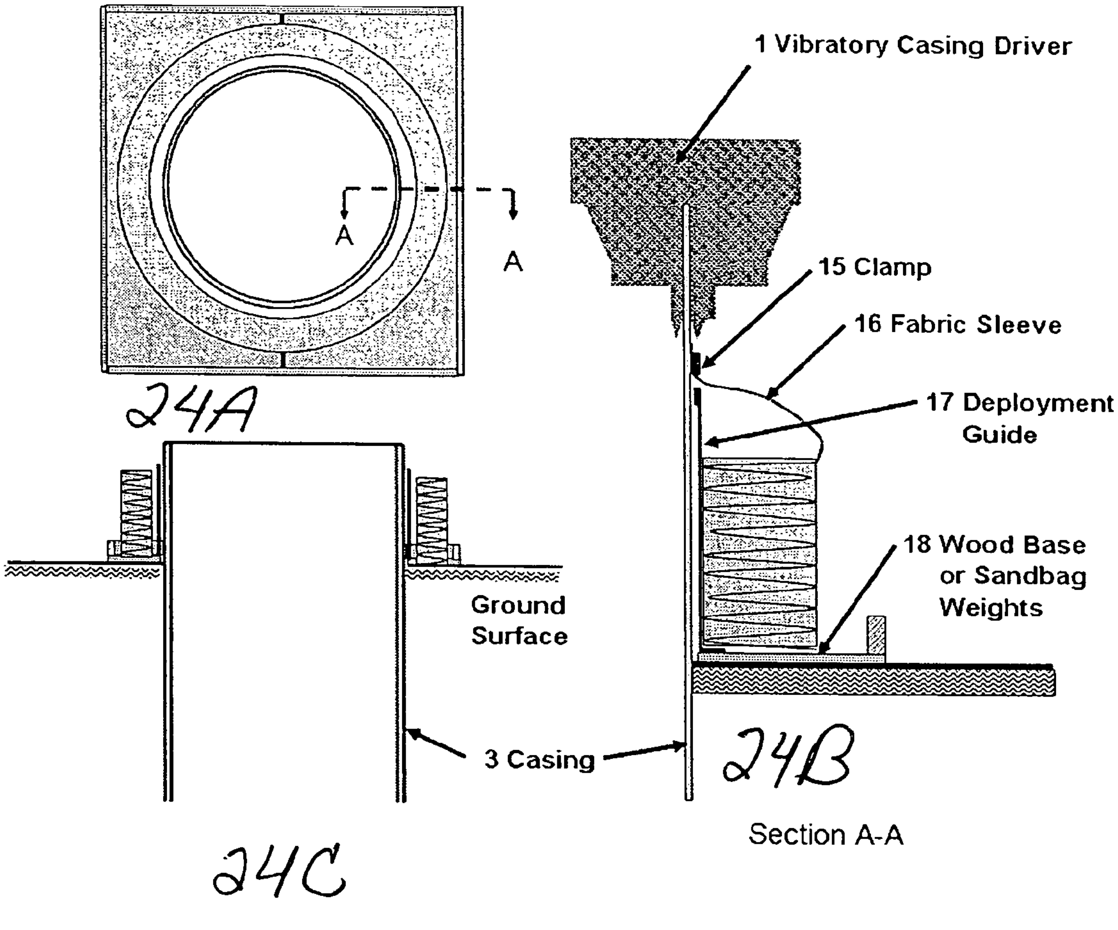
FIG. 24 is a collection of schematic, partial views of the top end of the casing with an optional enveloping fabric sleeve to contain the removed casing when the buried object extracted with it contains toxic or dangerous waste, for example, including top view (FIG. 24A), side, partial, cross-sectional detail view (FIG. 24B), and side, partial, cross-sectional view (FIG. 24C).
Figure 25:
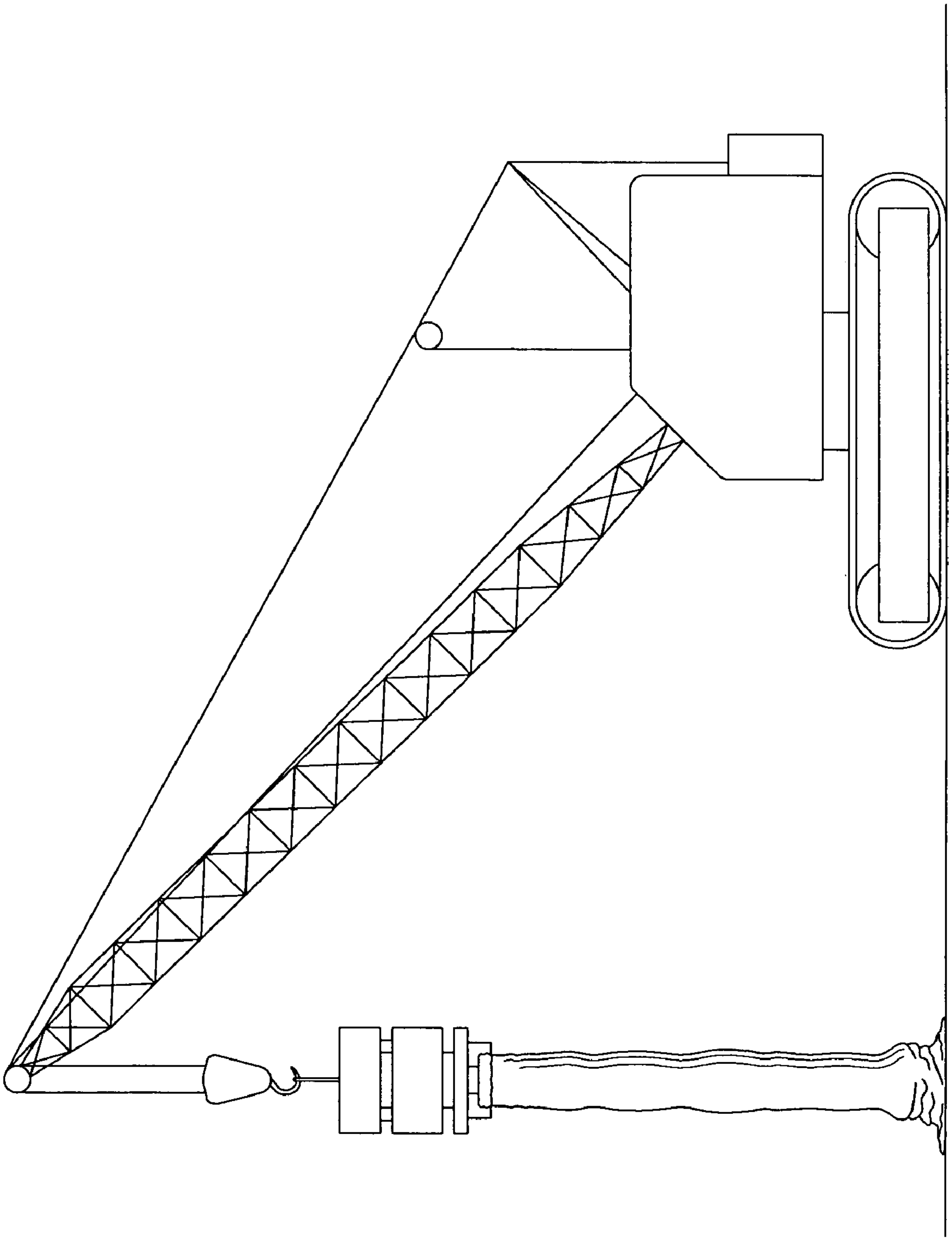
FIG. 25 is a side, schematic, perspective view of a casing being partially extracted from the ground with an optional covering fabric sleeve attached.
Figure 26:
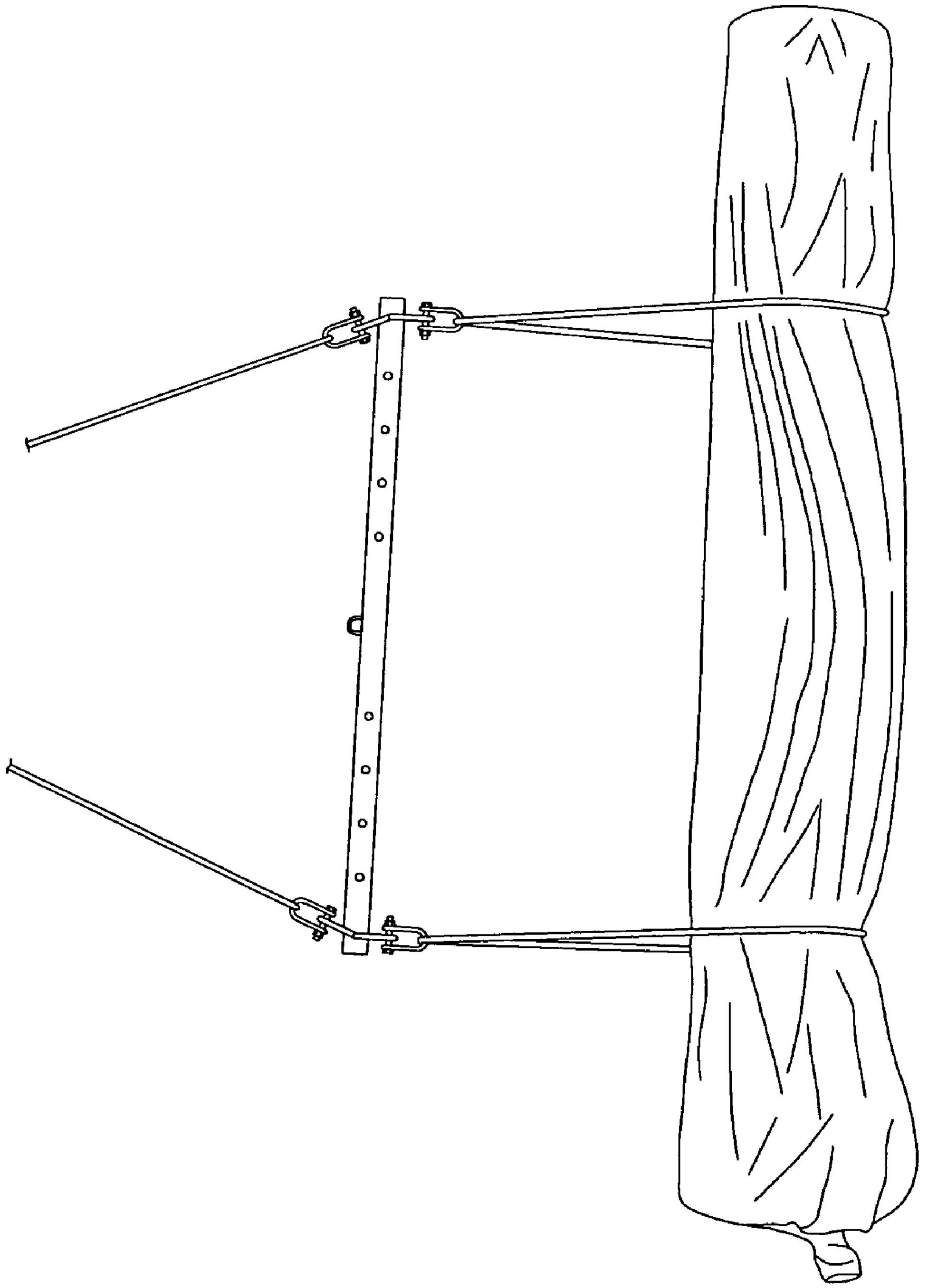
FIG. 26 is a side, schematic, perspective view of a fully extracted casing with an optional covering fabric sleeve attached.

Extraction of the buried waste (37) now encapsulated in the casing (3) begins for toxic or dangerous buried waste with attaching the fabric sleeve (16) to the casing (3) with the clamp (15) and attaching the wood base or sandbag weights (18) as illustrated in FIGS. 8, 24 and 25. For less dangerous wastes, the fabric sleeve (16) may not be required. The vibratory casing driver (2) is then preferably reattached to the casing (3) as it will be preferred to assist the crane in extracting the casing. To do this, preferably the hook is raised until the load indicator shows a value approximately 125% of the weight of the vibratory casing driver (2), casing (3), and captured core. The vibratory casing driver (2) is then jogged or activated momentarily to gently raise the casing a small distance. This will lower the load on the crane. The crane operator will again raise the hook until the load indicator reads the desired force and the jogging process repeated until the load moves without assist from the vibratory casing driver. FIG. 8 illustrates the casing (3) and core containing the buried waste (37) as extracted from the ground. Note that the soil caves in and forms a hole which must be backfilled with clean soil as soon as practicable for safety reasons. At this point the optional fabric sleeve (16) is cinched at the bottom, the load is moved laterally and laid on timbers in a horizontal position in preparation for removal of the vibratory casing driver (2) and then packaging and transfer of the wrapped casing to a TSD facility. FIG. 26 shows a casing (3) in an optional fabric sleeve (16) following extraction from the ground. The entire process does not require facility workers to be in close proximity to the waste thus minimizing exposure to radioactive sources, if any. Likewise, the waste is encapsulated within the casing (3) between the grout plug (19) and concrete cap (38) minimizing worker exposure to dangerous waste fumes or vapors. Use of a vibratory casing driver to extract a casing is not the only viable method. The casing may also be directly pulled if the crane has sufficient hoisting capacity. Also, the casing could be spun out with a rotary drilling rig, or hoisted using hydraulic jacks to overcome the skin friction.

Figure 13:
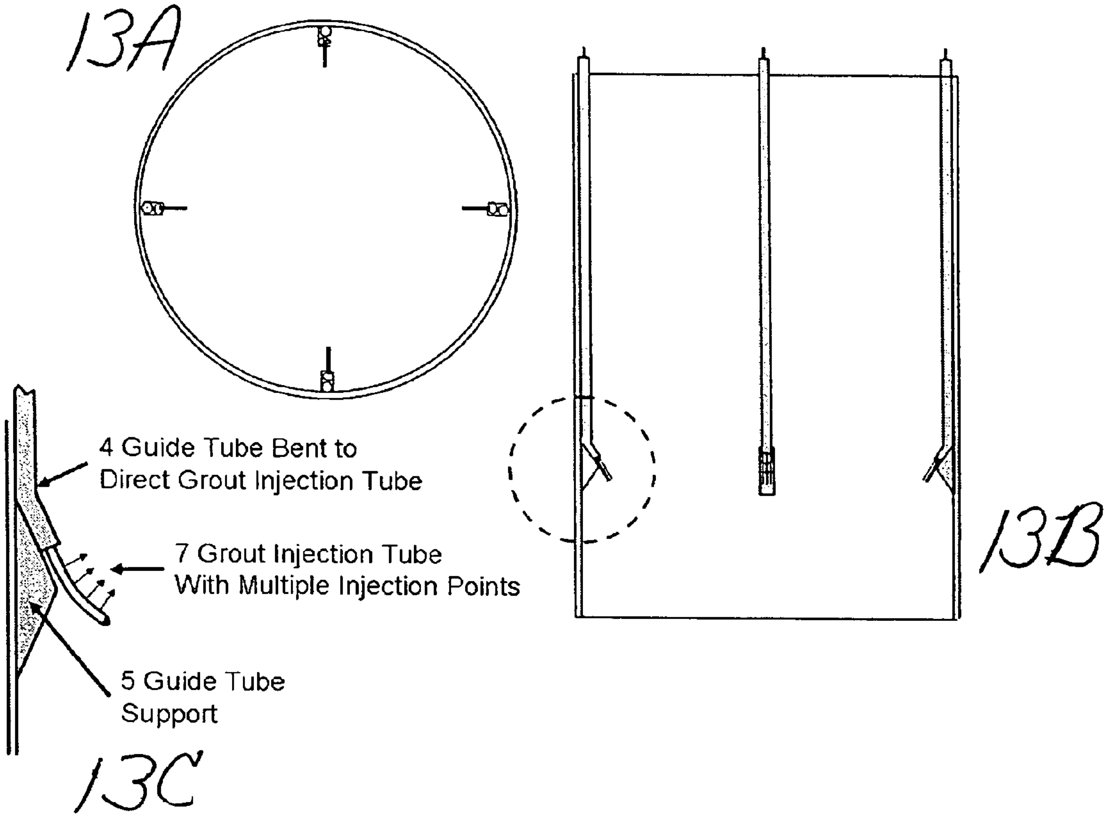
FIG. 13 is a schematic, detail collection of views of one embodiment of the grout injection system of the invention, in its deployed position including a top view (FIG. 13A), side view (FIG. 13B), and a magnified detailed view (FIG. 13C) from the dashed circle in FIG. 13B.

In preparation for forming the grout plug (19), the angle of the bend and associated angle of the guide tube support establish the trajectory of the grout tube as it is driven into the center of the casing. FIG. 13 shows the position of the grout injection tube (7) in its final position for this illustrated embodiment after it has been driven down the guide tube and bent inwards into the casing.

Figure 14:
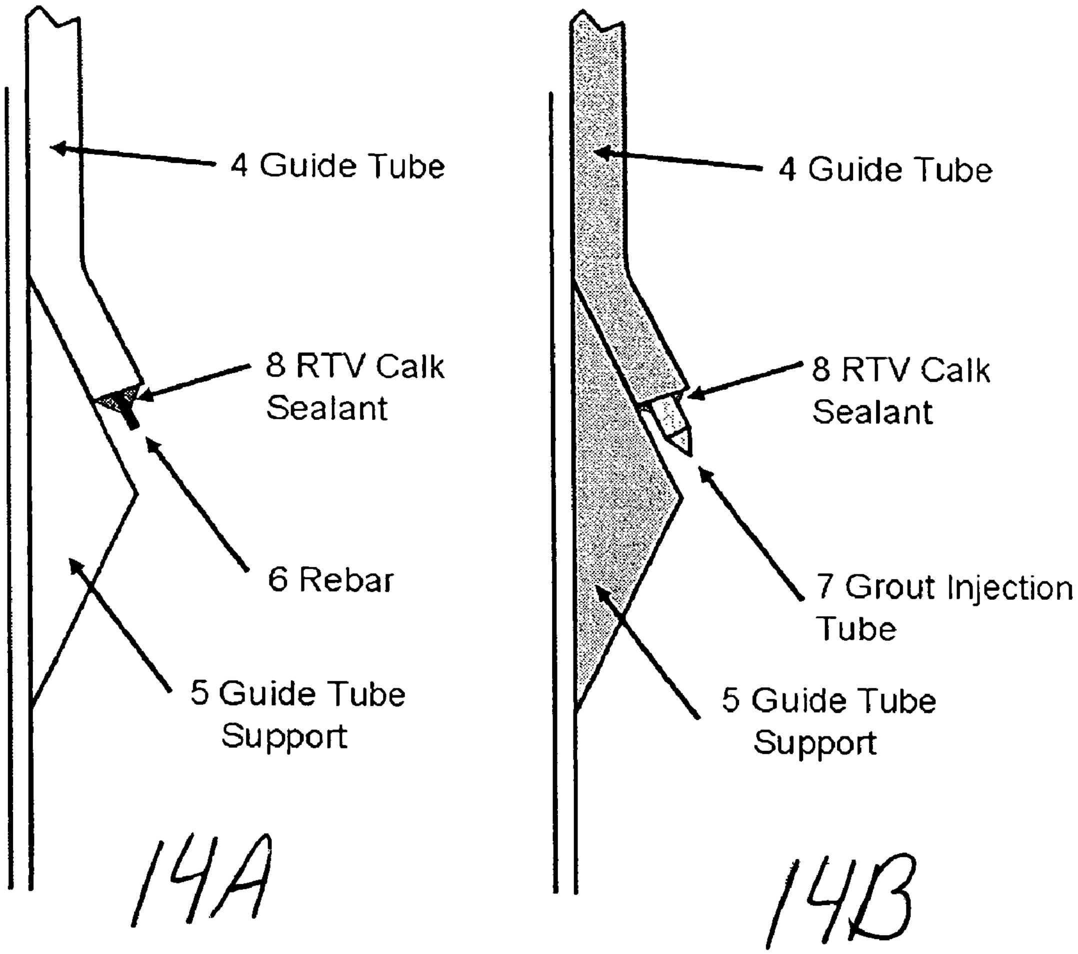
FIG. 14A is a further magnified view of FIG. 12C, but with the rebar in its undeployed position.
FIG. 14B is a further magnified view of FIG. 13C, but with the grout injection system in its undeployed position.

FIG. 14 shows the relative positions of the rebar (6) and grout injection tubes (7) to the guide tubes (4) after they are inserted into the guide tubes in prior to overcoring operations (i.e. driving the casing into the soil and encapsulating the waste). Preferably, room temperature vulcanizing (RTV) caulk sealant (8) is placed in the annulus between the guide tubes and the rebar and grout injection tubes to prevent soil from entering during the overcoring operation. FIG. 14 shows the guide tube (4), guide tube support (5), rebar (6), grout injection tube (7), and RTV caulk sealant (8). The configuration of the guide tube support (5) is such that it prevents direct impingement of the soil upon the end of the guide tube (4) and exposed portions of either the rebar (6) or grout injection tube (7) during the overcoring process. The annulus between the guide tube (4) and the rebar (6) can also be used to inject grout.

Figure 15:
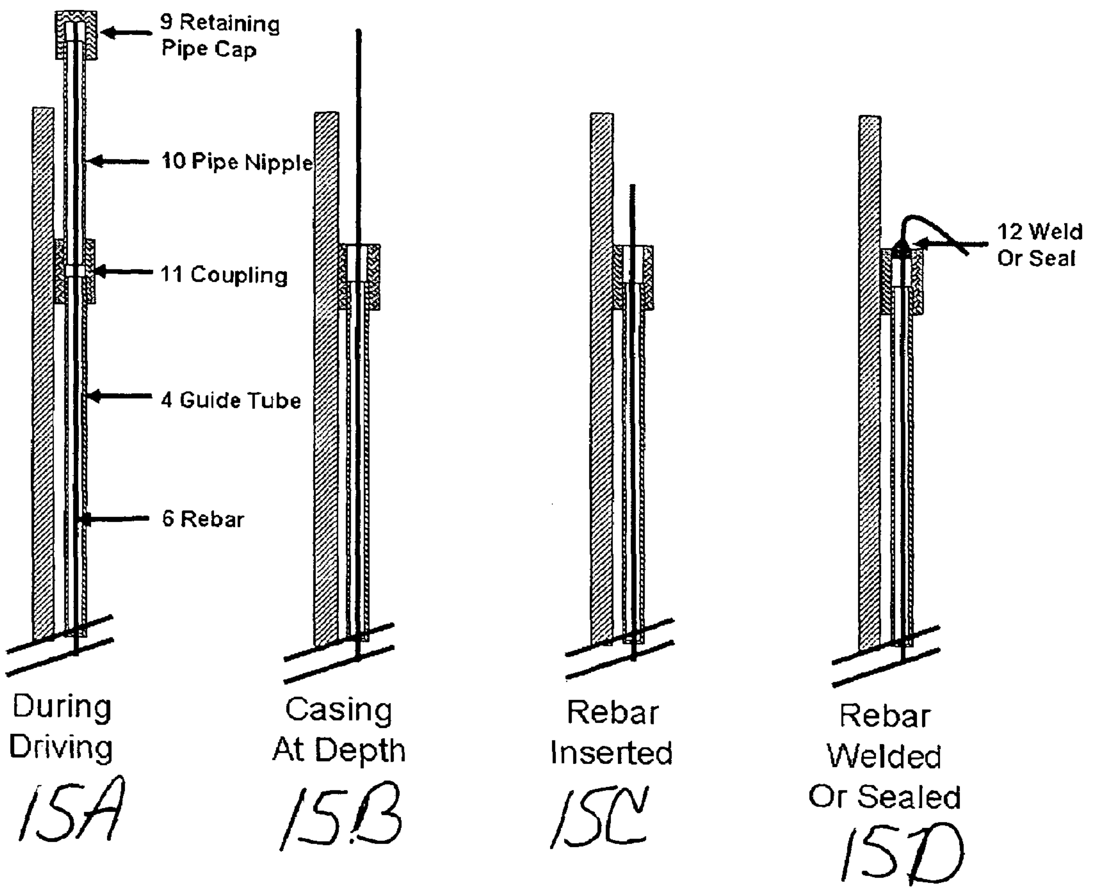
FIG. 15 is a collection of side, schematic, detail views of the top end of the optional rebar system of the invention in various sequential stages of installation.

FIG. 15 shows the configuration of the upper end of the rebar reinforcement system as it is configured through four steps in the overcoring and core capture operations. During driving, the rebar (6) is driven just past the bend in the guide tube (4) and sealed (See FIG. 14). A pipe nipple (10) is placed over the rebar (6) and screwed into a coupling (11) on the end of the guide tube (4) and a retaining pipe cap (9) screwed in place to prevent the rebar (6) from moving during the overcoring operation. Upon reaching full depth the pipe nipple (10) and retaining pipe cap (9) are removed. After this the rebar is driven past the bend in the guide tube (see FIG. 12) using a hammer or hammer drill. The final step is bending the rebar over and either sealing around the rebar (6) with RTV calk sealant or by a weld seal (12) to the coupling (11).

Figure 16:
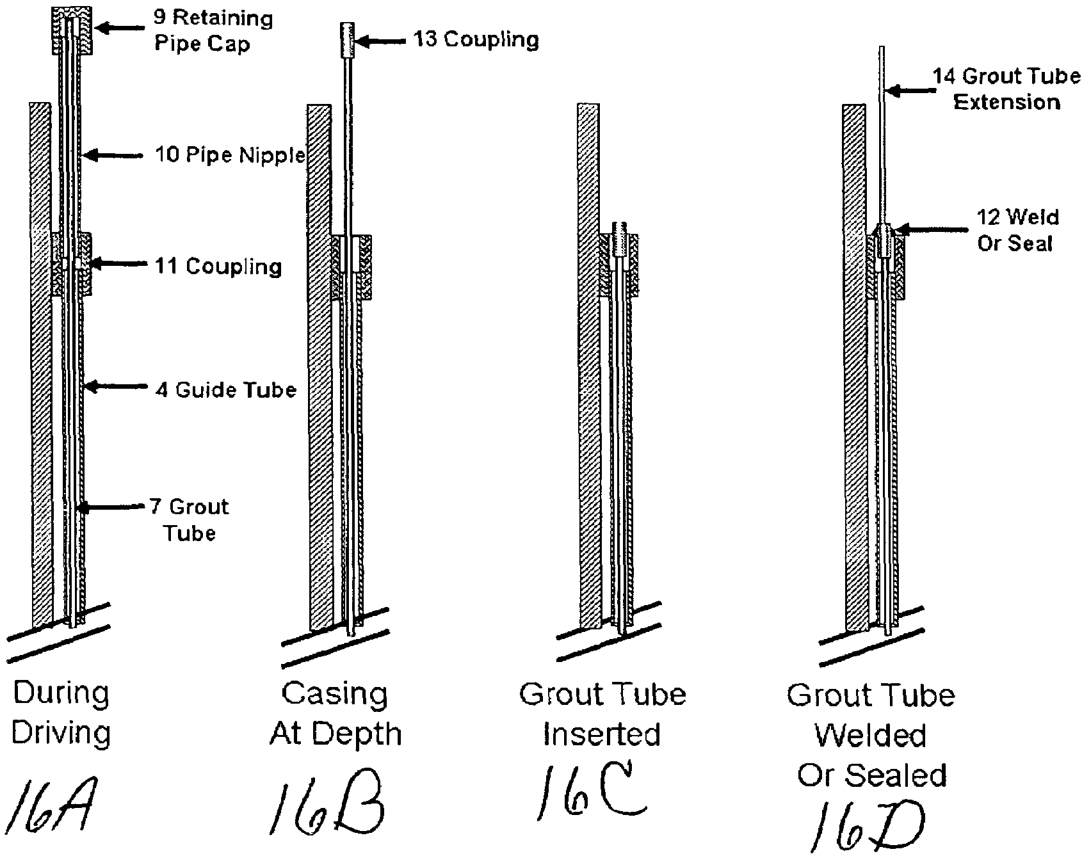
FIG. 16 is a collection of side, schematic, detail views of the top end of the grout injection system of one embodiment of the invention in various sequential stages of installation.
Figure 17:
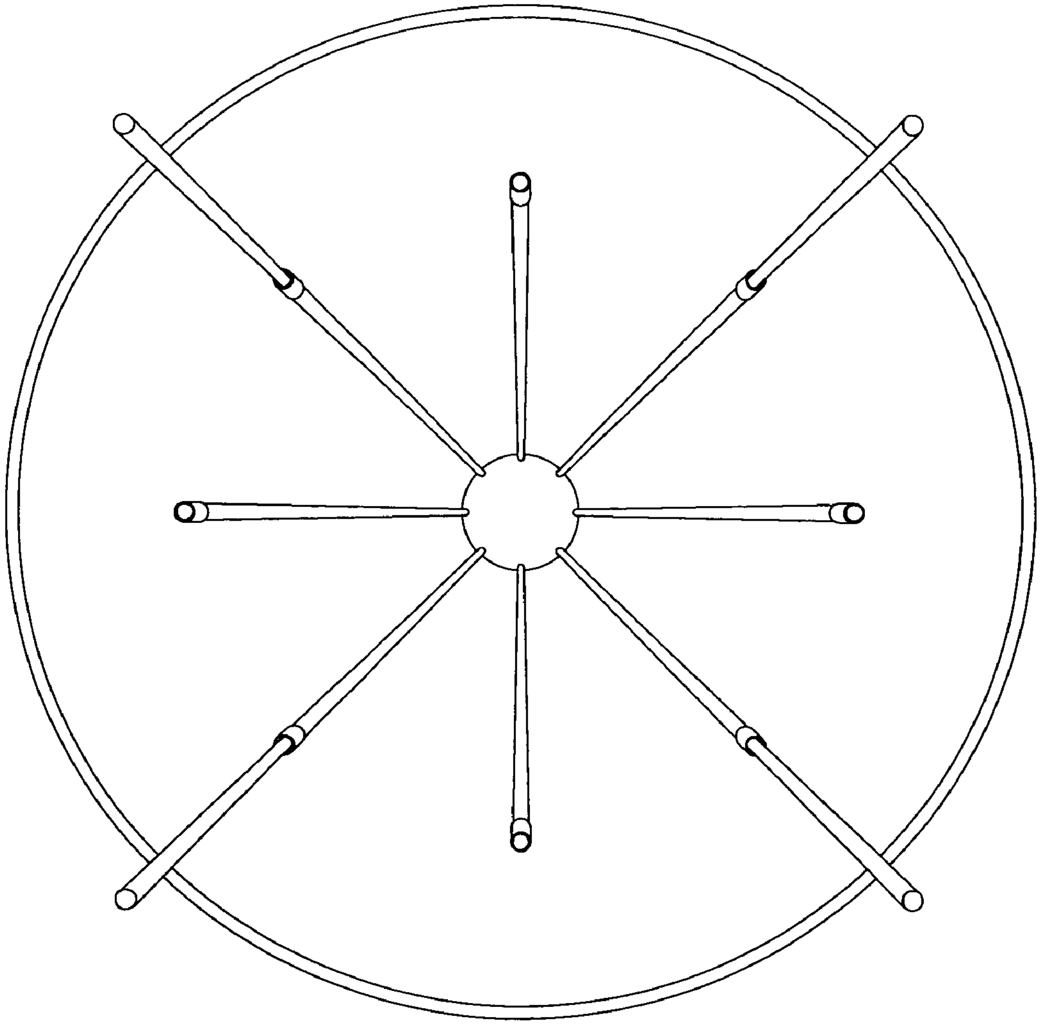
FIG. 17 is a top, perspective view of the inside of the casing, depicting the top ends of the optional rebar and grout tubes with fittings.

FIG. 16 shows the configuration of the upper end of the grout injection system as it is configured through four steps in the overcoring and core capture operations. During driving, the grout tube (7) is driven just past the bend in the guide tube (4) and sealed (See FIG. 14). A pipe nipple (10) is placed over the grout injection tube (7) and screwed into a coupling (11) on the end of the guide tube (4) and a retaining pipe cap (9) screwed in place to prevent the grout injection tube (7) from moving during the overcoring operation. Upon reaching full depth the pipe nipple (10) and retaining pipe cap (9) are removed. After this a coupling (13) is screwed on the end of the grout injection tube (7) and it is driven past the bend in the guide tube (see FIG. 13) using a hammer or hammer drill exposing the grout injection holes in the grout injection tube (7). The final step is sealing around the grout injection tube (6) with RTV caulk sealant or by a weld seal (12) to the coupling (11). A top, perspective view of the installed rebar and grout tubes inside the casing is depicted in FIG. 17.

Figure 18:
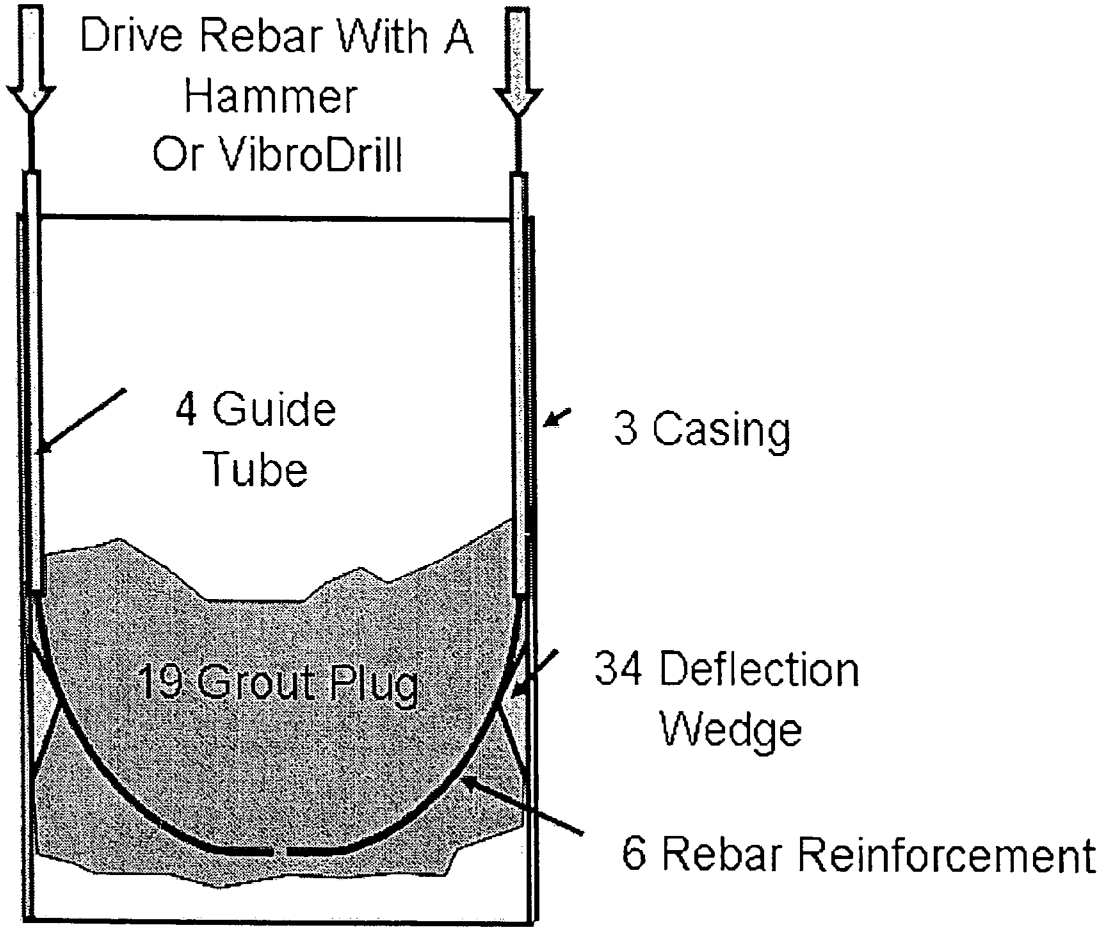
FIG. 18 is a side, schematic view of one embodiment of the invention with a bent tube and guide tube support for directing the optional rebar and/or grout injection tube away from the inside of the casing into the soil near the bottom of the casing.

An alternate design for the grout reinforcement system is shown in FIG. 18. In place of the guide tube (4) that is bent at the bottom, a straight length of pipe is used. Immediately below the pipe is a deflection wedge (34) manufactured from steel plate with a groove cut on the upper, angled surface. Thus the rebar (6) is guided down the tube where it is captured in the groove on the deflection wedge (34) and is then bent in a curve toward the center of the casing (3).

Figure 19:
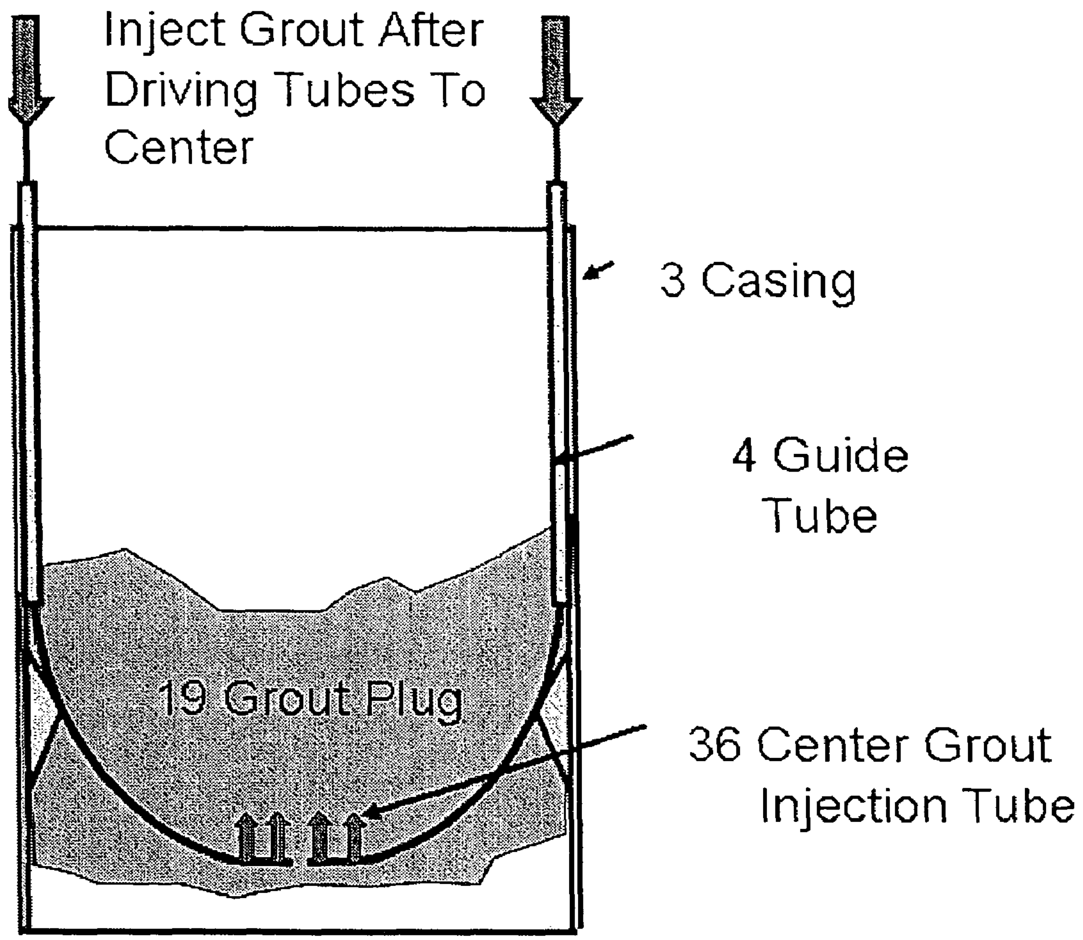
FIG. 19 is a side, schematic view of an alternative embodiment of the invention with the grout injection system wherein the grout may be injected near the center of the casing near its bottom, instead of near its periphery.

An alternate or enhancement to the grout injection system is shown in FIG. 19. This is a modification that shown in FIGS. 13, 14, and 16 whereby a center grout injection tube (36) is used. This tube is longer, sized to be driven into the center of the casing where the grout would be injected in the center as opposed to the periphery as was previously described. This alternate system could be added in cases where the grout plug does not completely fill the casing.

Figure 20:
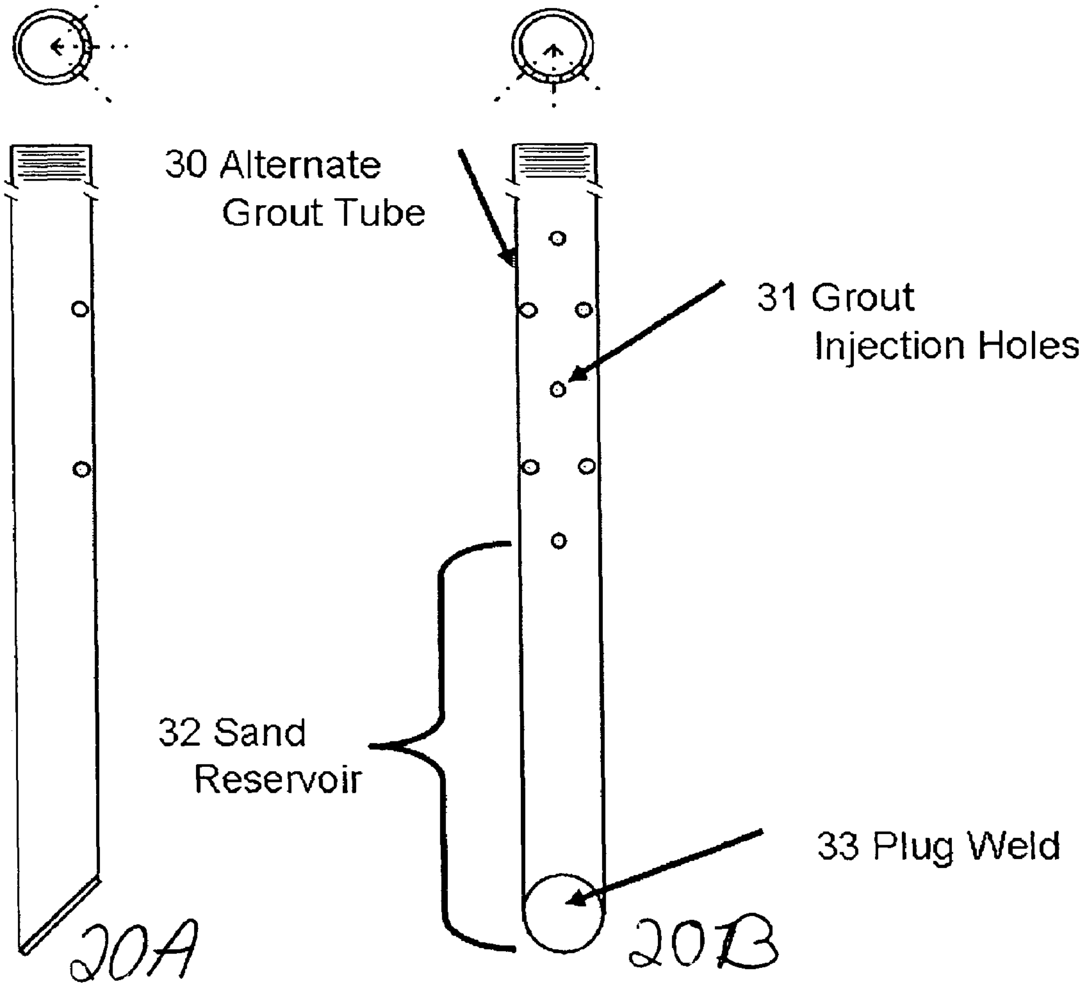
FIG. 20 is a collection of detail views of an alternative grout injection system of the invention.

An alternate grout injection system is shown in FIG. 20. This alternate system consists simply of an alternate grout injection tube (30) with a series of grout injection holes (31) located at the lower end which is plug welded and ground off at an angle (33). This tube is welded to the inside of the casing. To prevent plugging of the grout injection holes with sand or soil, a sand reservoir (32) is incorporated into the design. Material entering through the grout injection holes (31) during the overcoring operations falls into the reservoir preventing buildup of sand and plugging.

A schematic flow diagram for the grout injection system is depicted in FIG. 21. The grouting starts with attaching the grout hose (28) to the grout tube (7). Then, the grout bucket (24) is filled with a measured amount of polyurethane grout. The amount of grout is governed by the porosity or void space in the soil and the desired thickness of the grout plug (19). The suction line (21), prime line (22), and bypass line (23) are then placed into the grout bucket (24). The prime-pump selector valve (25) is placed in the prime position, bypass adjust needle valve (26) is completely opened, and the quarter turn shut-off valve (29) opened. The grout pump (20) is then activated and upon verification of flow out of the bypass line (23) the prime-pump selector valve (25) is placed into the pump position. At that point most of the flow will be returning to the grout bucket (24) via the bypass line (23). The grout flow rate is critical and is governed by the type and set or gelling rate of the polyurethane permeation grout. The rate must be established by trials in the soil being grouted to ensure that the grout pumping rate is not so high as to create a preferential pathway, thus moving the grout away from the desired location of the grout plug (19). Conversely the pumping rate must not be too slow as to start the set or gelling of the grout prior to pumping all the grout, which could affect the size and shape of the grout plug (19).

Figure 22:
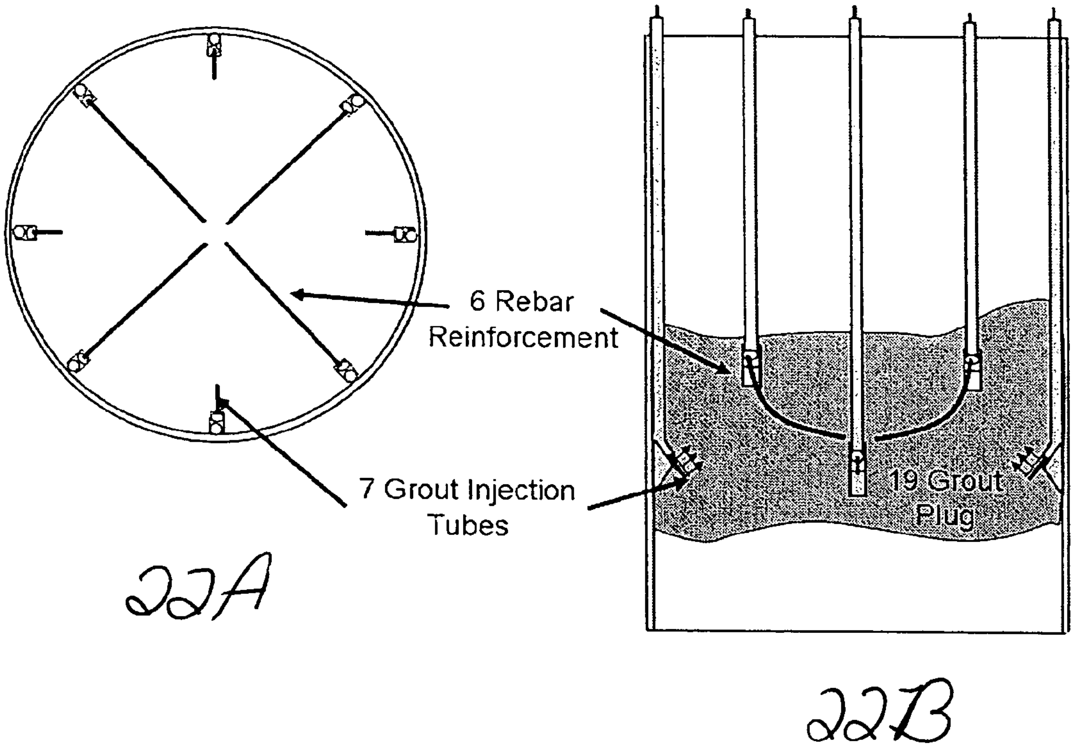
FIG. 22A is a top view of one embodiment of the invention, with both rebar reinforcement and grout injection tubes present.
FIG. 22B is a side, schematic view of the view depicted in FIG. 22A.

FIG. 22 illustrates the final configuration of the casing with the grout reinforcement system for insertion of four rebar and the grout injection system for injecting grout at four places. This figure also shows the final placement of the grout plug, indicating where the grout is injected and the relative position of the rebar.

Figure 23:
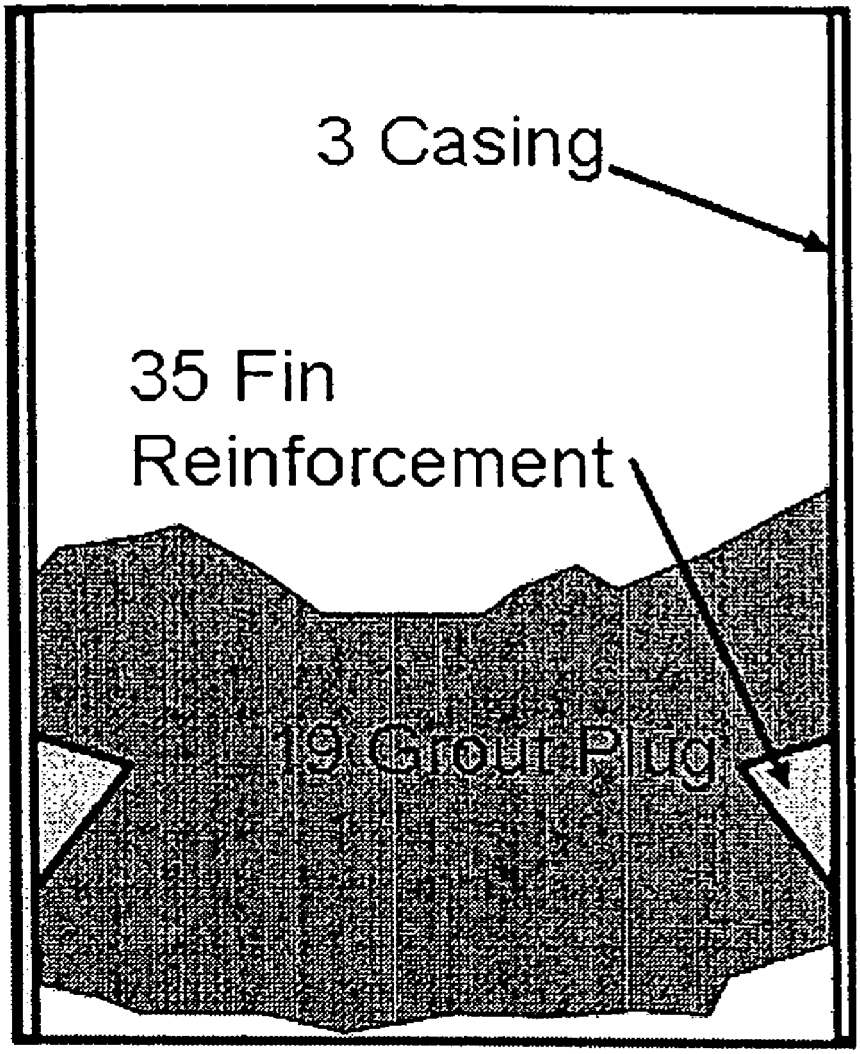
FIG. 23 is a side, schematic view of an optional interior ring or set of fins for assisting with holding the cured grout plug within the bottom of the casing.

An alternative to the grout reinforcement system is illustrated in FIG. 23. To reinforce the grout plug, one (or more) fin reinforcement (35) is welded to the inside of the casing (3) where it is encased within the grout plug (19). This concept is incorporated into both the grout injection system and the grout reinforcement system as shown in FIG. 14, whereby, the guide tube support (5) acts as a fin which protrudes into the grout plug (19) and acts as reinforcement.

In an alternative embodiment of the invention, the grout injection tubes may be arranged to discharge grout at different depths within the casing. These discharges may be simultaneous or sequential. For example, grout may be discharged at different depths within the casing all at the same time. Or, grout may be discharged at shallower depths first, and then at deeper depths later, or vice-versa. This first way, shallower discharges may slightly "fluidize" the ground, at least until the grout begins to set up, facilitating further deepening of the casing into the ground. Also, these both ways, when grout has been discharged at several depths within the casing, more of the entire contents within the casing may be solidified, aiding the securement and stabilization of the buried object within the casing. To further assist in these alternate embodiments, the fin or ledge reinforcement of FIG. 23 may be provided also at several depths within the casing.

In another alternative embodiment of the invention, the grout injection tubes may be separate, or independent, from the inside wall of the casing. For example, with deference for the location of the buried object within the casing, separate grout injection tubes may be pushed down in the annular space between the inner wall of the casing and the buried object. This way, grout may be discharged with particular depth and direction control. Depth may easily be controlled by the length of the grout discharge tube inserted. Direction may easily be controlled by the direction of the exit nozzles from the grout injection tubes (see FIG. 20). For example, with a grout tube with directional nozzles (holes) as depicted in FIG. 20, if the tube is rotated 360°, a cylindrical discharge will result. Likewise, if the tube is rotated just 180°, a half-cylindrical discharge will result, etc. This way, the grout plug configuration may be controlled with more particularity.

FIG. 24 shows the location of a containment sleeve mounted on the casing after it has been driven to depth during the overcoring operations. The fabric sleeve (16) is an impervious fabric welded or sewn into a tube with a reinforcing stiffener at the upper end, 4 or more grommets at the lower end (not shown) and a series of loops (not shown) near the lower end of the sleeve for attaching the closure mechanism (not shown). The fabric sleeve (16) is gathered over the deployment guide (17). A wood base (or sand bags) (18) is placed on the ground around the casing (3) and the fabric sleeve (16) and deployment guide (17) assembly placed over the casing (3). The upper end of the fabric sleeve (16) is then attached to the casing (3) with a clamp (15). The wood base or sand bags (18) is attached to the grommets on the lower end of the fabric sleeve (16). As the casing (3) is extracted, the fabric sleeve (16) automatically deployed and is suspended when the casing (3) clears the ground. At this point the lower end of the fabric sleeve (16) is cinched off and the wood base or sand bags (18) cut off. FIGS. 25 and 26 show a partially and fully extracted casing, respectively, encapsulated in a fabric sleeve.

Figure 27:
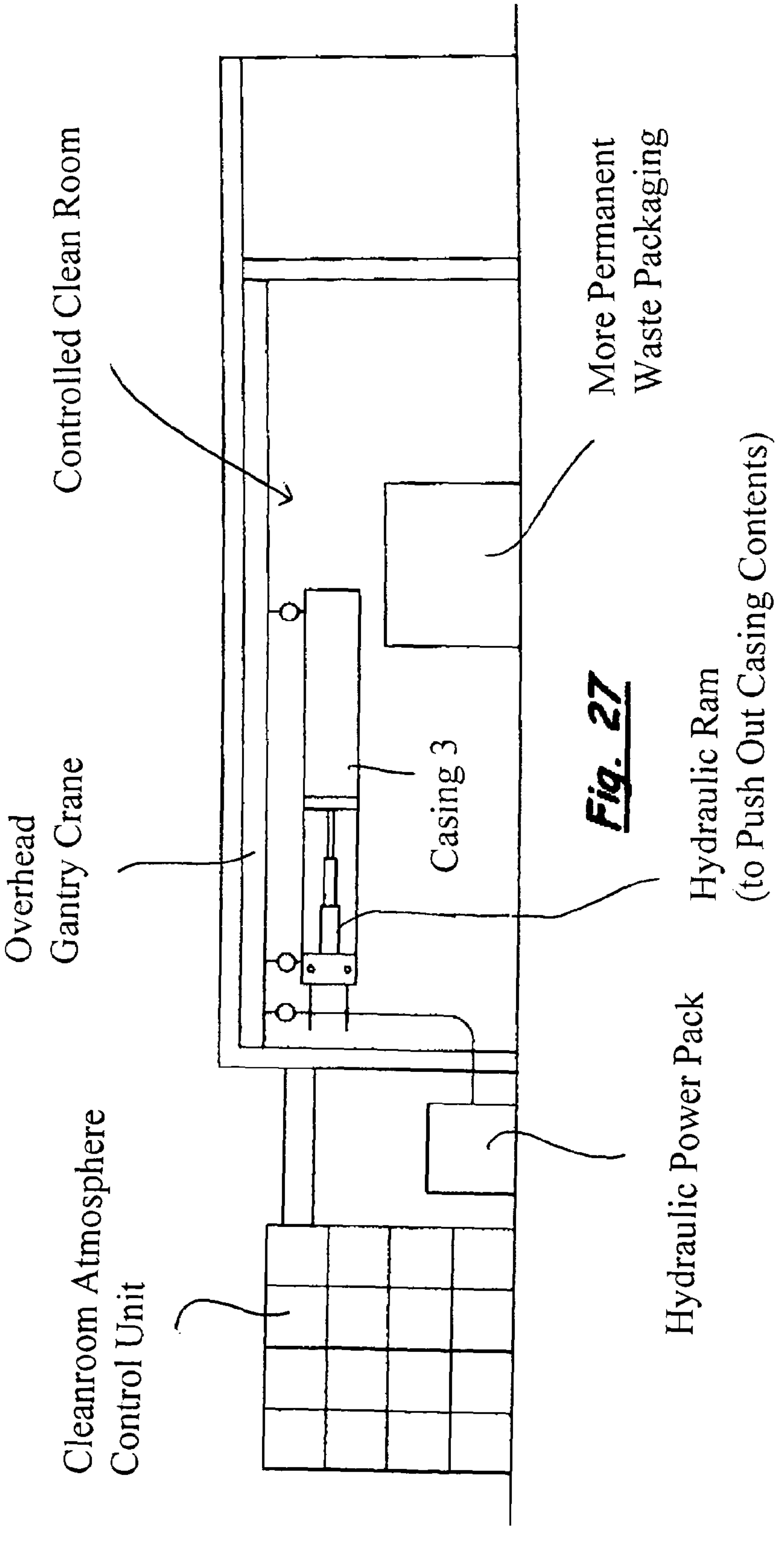
FIG. 27 is a side, schematic view of a fully extracted casing being further handled or treated.

FIG. 27 is a schematic depiction of a fully extracted casing being further handled in a safe house for decontamination or for more permanent repackaging, for example.

Although this invention has been described above with reference to particular means, materials, and embodiments, it is to be understood that the invention is not limited to these disclosed particulars, but extends instead to all equivalents within the scope of the following claims.

We claim:

1. A method for removal of a buried object, comprising:

moving a casing with an open bottom into ground containing a buried object;

surrounding the buried object in the ground with the casing;

closing the open bottom of the casing by injecting grout into the ground near the bottom of the casing; and, moving the casing with its bottom closed to remove the buried object.

2. The method of claim 1 wherein the casing is steel pipe.

3. The method of claim 1 wherein the casing is rectangular.

4. The method of claim 1 wherein the casing is moved with a vibratory driver.

5. The method of claim 1 wherein the casing is moved with a rotary driver.

6. The method of claim 1 wherein the casing is moved with a linear jack.

7. The method of claim 1 wherein reinforcement bar for the grout is extended from near an inside wall of the casing towards the center of the casing.

8. The method of claim 1 wherein tubes for injecting the grout are secured to an inner wall of the casing.

9. The method of claim 1 wherein tubes for injecting the grout are separate of the casing.

10. The method of claim 1 wherein grout is injected into the ground before the casing is moved into the ground.

11. The method of claim 1 wherein grout is injected into the ground after the casing is moved into the ground.

12. The method of claim 1 wherein grout is injected into the ground at different depths.

13. The method of claim 1 wherein a sealed cap is placed on the top of the casing prior to the casing being removed from the ground.

14. The method of claim 1 wherein the casing has an interior ledge for cooperating with the grout seal near the bottom of the casing to securely hold the seal therein.

15. The method of claim 1 wherein the casing is surrounded by a fabric material as the casing is moved to remove the buried object.

16. A system for removal of a buried object comprising:

a casing with an open bottom inserted into ground containing a buried object, the casing surrounding the buried object;

a grout-injection system adapted to inject grout into the ground near the open bottom of said casing, and a casing driver connected to the casing, wherein reinforcement bar for the grout delivered by the grout injection system is adapted to extend from near an inside wall of the casing toward the center of the casing, after the object is surrounded by the casing.

17. The system of claim 16, wherein the casing is steel pipe.

18. The system of claim 16, wherein the casing is rectangular.

19. The system of claim 16, wherein the casing is moved with a vibratory driver.

20. The system of claim 16, wherein the casing is moved with a rotary driver.

21. The system of claim 16, wherein the casing is moved with a linear jack.

22. The system of claim 16, wherein tubes for injecting grout are secured to an inner wall of the casing.

23. The system of claim 16, wherein tubes for injecting grout are separate of the casing.

24. The system of claim 16, wherein a sealed cap is on top of the casing.

25. The system of claim 16, wherein the casing has an interior ledge for cooperating with a grout seal near the bottom of the casing to securely hold the seal therein.

26. The system of claim 16, wherein the casing is surrounded by a fabric material after removal of the casing from the ground.

* * * * *

UNITED STATES PATENT AND TRADEMARK OFFICE

CERTIFICATE OF CORRECTION

PATENT NO. : 7,381,010 B2
APPLICATION NO. : 11/512745
DATED : June 3, 2008
INVENTOR(S) : Alexander et al.

It is certified that error appears in the above-identified patent and that said Letters Patent is hereby corrected as shown below:

Title page, item [73] assignee should read:

NORTH WIND, INC. (Assignee of the interest of Grams, Crass, and Riess).

Signed and Sealed this

Nineteenth Day of January, 2010

David J. Kappos
*Director of the United States Patent and Trademark Office*